(12) United States Patent
Giannakis et al.

(10) Patent No.: US 7,292,647 B1
(45) Date of Patent: Nov. 6, 2007

(54) WIRELESS COMMUNICATION SYSTEM HAVING LINEAR ENCODER

(75) Inventors: Georgios B. Giannakis, Minnetonka, MN (US); Yan Xin, St. Paul, MN (US); Zhengdao Wang, Ames, IA (US)

(73) Assignee: Regents of the University of Minnesota, Minneapolis, MN (US)

( * ) Notice: Subject to any disclaimer, the term of this patent is extended or adjusted under 35 U.S.C. 154(b) by 889 days.

(21) Appl. No.: 10/420,353

(22) Filed: Apr. 21, 2003

Related U.S. Application Data

(60) Provisional application No. 60/374,981, filed on Apr. 22, 2002, provisional application No. 60/374,886, filed on Apr. 22, 2002, provisional application No. 60/374,935, filed on Apr. 22, 2002, provisional application No. 60/374,934, filed on Apr. 22, 2002, provisional application No. 60/374,933, filed on Apr. 22, 2002.

(51) Int. Cl.
*H04L 27/00* (2006.01)
(52) U.S. Cl. .................................... 375/295
(58) Field of Classification Search ............... 375/295, 375/316
See application file for complete search history.

(56) References Cited

U.S. PATENT DOCUMENTS

| | | | |
|---|---|---|---|
| 6,188,717 B1 | 2/2001 | Kaiser et al. | |
| 6,351,499 B1 * | 2/2002 | Paulraj et al. | 375/267 |
| 6,442,214 B1 | 8/2002 | Boleskei et al. | |
| 6,452,981 B1 | 9/2002 | Raleigh et al. | |
| 6,614,861 B1 | 9/2003 | Terry et al. | |
| 6,865,237 B1 * | 3/2005 | Boariu et al. | 375/295 |
| 6,891,897 B1 | 5/2005 | Bevan et al. | |
| 6,898,248 B1 * | 5/2005 | Elgamal et al. | 375/259 |
| 6,956,815 B2 * | 10/2005 | Chiodini | 370/210 |
| 2002/0163892 A1 * | 11/2002 | Hassibi et al. | 370/310 |
| 2002/0167962 A1 | 11/2002 | Kowalski | |
| 2004/0146014 A1 | 7/2004 | Hammons, Jr. et al. | |

OTHER PUBLICATIONS

A. Aggarwal, S. Savage, and T. Anderson, "Understanding the Performance of TCP Pacing," in Proc. Of IEEE Inforcom 00, Tel-Aviv, Israel, Mar. 2000.

D. Agrawal, V. Tarokh, A. Naguib, and N. Seshadri, "Space-Time Coded OFDM for High Data-Rate Wireless Communication Over Wideband Channels," Proc. Of Vehicular Technology Conf., pp. 2232-2236, Ottawa, Ont, Canada, May 18-21, 1998.

N. Al-Dhahir, "Single-Carrier Frequency-Domain Equalization for Space-Time Block-Coded Transmission over Frequency-Selective Fading Channels," IEEE Communications Letters, vol. 5, No. 7, pp. 304-306, Jul. 2001.

(Continued)

*Primary Examiner*—David C. Payne
*Assistant Examiner*—Nader Bolourchi
(74) *Attorney, Agent, or Firm*—Shumaker & Sieffert, P.A.

(57) ABSTRACT

In general, linear complex-field encoding techniques are proposed For example, transmitter of a wireless communication system includes an encoder and a modulator. The encoder linearly encodes a data stream to produce an encoded data stream. The modulator to produce an output waveform in accordance with the encoded data stream for transmission through a wireless channel. The modulator generates the output waveform as a multicarrier waveform having a set of subcarriers, e.g., an Orthogonal Frequency Division Multiplexing (OFDM) waveform. The encoder linearly encodes the data stream so that the subcarriers carry different linear combinations of information symbols of the data stream.

28 Claims, 8 Drawing Sheets

OTHER PUBLICATIONS

N. Al-Dhahir and A.H. Sayed, "The Finite-Length Multi-Input Multi-Output MMSE-DFE," IEEE Trans. On Signal Processing, vol. 48, No. 10, pp. 1-38, Oct. 2000.

S.L. Ariyavistakul, "Turbo Space-Time Processing to Improve Wireless Channel Capacity," IEEE Trans. On Communications, vol. 48, No. 8, pp. 1347-1359, Aug. 2000.

S. Barbarossa and F. Cerquetti, "Simple Space-Time Coded SS-CDMA Systems Capable of Perfect MUI/ISI Elimination," IEEE Communications Letters, vol. 5, No. 12, pp. 471-473, Dec. 2001.

S. Benedetto, G. Montorsi, D. Divsalar, and F. Pollara, "A Soft-Input Soft-Output Maximum A Posterior (MAP) Module to Decode Parallel and Serial Concatenated Codes," TDA Progress Report, vol. 42-127, No. 15, 1996, downloadable from http://tmo.jpl.nasa.gov/tmo/progress_report/index.html.

C. Berrou, A. Glavieux, and P. Thitimajsima, "Near Shannon Limit Error-Correcting Coding and Decoding: Turbo Codes (1)," in Proc. Of Intl. Conf. On Com., Geneva, Switzerland, May 1993, pp. 1064-1070.

S. Bhashyam, A.M. Sayeed, and B. Aazhang, "Time-Selective Signaling and Reception for Communication over Multipath Fading Channels," IEEE Trans. On Communications, vol. 48, No. 1, pp. 1-34, Jan. 2000.

E. Biglieri, J. Proakis, and S. Shamai, "Fading Channels: Information-Theoretic and Communications Aspects," IEEE Trans. On Information Theory, vol. 44, No. 6, pp. 2619-2692, Oct. 1998.

J. Boutros and E. Viterbo, "Signal Space Diversity: A Power-and Bandwidth-Efficient Diversity Technique for the Rayleigh Fading Channel," IEEE Transactions on Information Theory, vol. 44, No. 4, pp. 1453-1467, Jul. 1998.

H. Bolcskei and A.J. Paulraj, "Space-Frequency Codes for Broadband Fading Channels," in Proc. of IEEE Int. Symposium on Information Theory, pp. 219, Washington D.C., Jun. 24-29, 2001.

H. Bolcskei and A.J. Paulraj, "Space-Frequency Coded Broadband OFDM Systems," in Proc. of Wireless Communications and Networking Conference, vol. 1, pp. 1-6, Chicago, IL, Sep. 23-28, 2000.

D.K. Borah and B. Hart, "Receiver Structures for Time-Varying Frequency-Selective Fading Channels," IEEE Journal of Selected Areas in Communications, vol. 17, No. 11, pp. 1863-1875, Nov. 1999.

J.K. Cavers, "Optimized Use Of Diversity Modes In Transmitter Diversity Systems," in Proc. of the Vehicular Technology Conf., vol. 3, Amsterdam, The Netherlands, 1999, pp. 1768-1773.

D. Dardari and V. Tralli, "High-Speed Indoor Wireless Communications at 60 GHz with Coded OFDM," IEEE Transactions on Communications, vol. 47, No. 11, pp. 1709-1721, Nov. 1999.

V.M. DaSilva and E. S. Sousa, "Fading-Resistant Modulation Using Several Transmitter Antennas," IEEE Transactions on Communications, vol. 45, No. 10, pp. 1236-1244, Oct. 1997.

A. Duel-Hallen, S. Hu, and H. Hallen, "Long-Range Prediction of Fading Signals," IEEE Signal Processing Magazine, pp. 62-75, May 2000.

S. Floyd, M. Handley, J. Padhye, and J. Widmer, "Equation-Based Congestion Control for Unicast Applications," in Proc. Of SIGCOMM'00.

G.J. Foschini and M.J. Gans, "On Limits of Wireless Communications in a Fading Environment When Using Multiple Antennas," Wireless Personal Communications, vol. 6, No. 3, pp. 311-335, Mar. 1998.

G.B. Giannakis, X. Ma, G. Leau, and S. Zhou, "Space-Time-Doppler Coding Over Time-Selective Fading Channels With Maximum Diversity And Coding Gains," Proc. Of Intl. Conf. On ASSP, Orlando, FL, May 13-17, 2002, pp. III-2217-III-2220.

G.B. Giannakis and S. Zhou, "Optimal Transmit-Diversity Precoders for Random Fading Channels," in Proc. of Globecom Conf., vol. 3, San Francisco, CA, Nov. 27-Dec. 1, 2000.

G.B. Giannakis and C. Tepedelenlioglu, "Basis Expansion Models and Diversity Techniques for Blind Identification and Equalization of Time-Varying Channels," Proceedings of the IEEE, vol. 86, No. 10,pp. 1969-1986, Oct. 1998.

X. Giraud, E. Boutillon, and J.C. Belfiore, "Algebraic Tools to Build Modulation Schemes for Fading Channels," IEEE Transactions on Information Theory, vol. 43, pp. 938-952, May 1997.

D. Gore, S. Sandhu, and A. Paulraj, "Delay Diversity Code for Frequency Selective Channels," Electronics Letters, vol. 37, No. 20, pp. 1230-1231, Sep. 27, 2001.

J. Hagenauer, and P. Hoeher, "A Viterbi Algorithm with Soft-Decision Outputs and Its Applications," in Proc. Of the IEEE 1989 Global Communications Conference, Dallas, Texas, pp. 1680-1686, Nov. 1989.

B. Hassibi and B.M. Hochwald, "High-Rate Codes that are Linear in Space and Time," IEEE Trans. On Information Theory, pp. 1-56, revised Apr. 2001; URL: http://mars.bell-labs.com/cm/ms/what/mars/index.html.

A. Hiroike, F. Adachi, and N. Nakajima, "Combined Effect of Phase Sweeping Transmitter Diversity and Channel Coding," IEEE Trans. On Vehicular Technology, pp. 170-176, May 1992.

R. Hoshyar, S.H. Jamali, and A.R.S. Bahai, "Turbo Coding Performance in OFDM Packet Transmission," in Proc. IEEE VTC, Tockyo, Japan, 2000, vol. 2, pp. 805-810.

S.A. Jafar, S. Vishwanath, and A. Goldsmith, "Channel Capacity and Beamforming for Multiple Transmit and Receive Antennas with Covariance Feedback," in Proc. of International Conference on Communications, vol. 7, Helsinki, Finland, Jun. 2001.

G. Jongren, M. Skoglund, and B. Ottersten, "Combining Transmit Beamforming and Orthogonal Space-Time Block Codes by Utilizing Side Information," IEEE Sensor Array and Multichannel Signal Processing Workshop, Mar. 14, 2000.

G. Jongren, M. Skoglund, and B. Ottersten, "Combining Transmit Antenna Weights and Orthogonal Space-Time Block Codes by Utilizing Side Information," in Proceedings of the 33$^{rd}$ Asilomar Conference on Signals, Systems and Computers, Oct. 23, 1999.

G. Jongren and M. Skoglund, "Utilizing Quantized Feedback Information in Orthogonal Space-Time Block Coding," in Proceedings IEEE Global Telecommunications Conference, Nov. 27, 2000.

G. Kaplan and S. Shamai, "Achievable Performance Over the Correlated Rician Channel," IEEE Transaction on Communications, vol. 42, No. 11, pp. 2967-2978, Nov. 1994.

W.-Y. Kuo and M.P. Fitz, "Design and Analysis of Transmitter Diversity Using Intentional Frequency Offset for Wireless Communications," IEEE Trans. On Vehicular Technology, vol. 46, No. 4, pp. 871-881, Nov. 1997.

B. Le Floch, M. Alard, and C. Berrou, "Coded Orthogonal Frequency Division Multiplex," Proceedings of the IEEE, vol. 83, No. 6, pp. 982-996, Jun. 1995.

G. Leus, S. Zhou, and G.B. Giannakis, "Multi-User Spreading Codes Retaining Orthagonality through Unknown Time- and Frequency-Selective Fading," Proc. Of GLOBECOM, vol. 1, pp. 259-263, San Antonio, TX, Nov. 25-29, 2001.

Y. Li, "Simplified Channel Estimation for OFDM Systems With Multiple Transmit Antennas," IEEE Transactions On Wireless Communications, vol. 1, No. 1, pp. 67-75, Jan. 2002.

E. Lindskog and A. Paulraj, "A Transmit Diversity Scheme for Channels with Intersymbol Interference," Proceedings Of International Conference On Comm., vol. 1, pp. 307-311, Jun. 2000.

Y. Liu, M. P. Fitz, and O. Y. Takeshita, "Space-Time Codes Performance Criteria and Design for Frequency Selective Fading Channels," Proc. Of International Conference on Comm., Helsinki, Finland, Jun. 11-15, 2001.

Z. Liu, Y. Xin, and G.B. Giannakis, "Linear Constellation Precoding for OFDMW With Maximum Multipath Diversity and Coding Gains," IEEE Transactions On Communications, vol. 51, No. 3, pp. 416-427, Mar. 2003.

Z. Liu, Y. Xin, and G.B. Giannakis, "Space-Time-Frequency Coded OFDM Over Frequency-Selective Fading Channels," IEEE Transactions on Signal Processing, vol. 50, No. 10, pp. 2465-2476, Oct. 2002.

Z. Liu, Y. Xin, and G.B. Giannakis, "Space-Time-Frequency Trellis Coding for Frequency-Selective Fading Channels", pp. 145-149, 2002.

Z. Liu, Y. Xin, and G.B. Giannakis, "Space-Time-Frequency Block Coded OFDM with Subcarrier Grouping and Constellation Precoding," Proc. Of Intl. Conf. on ASSP, Orlando, FL, May 13-17, 2003, pp. III-2205-III-208.

B. Lu and X. Wang, "Space-Time Code Design in OFDM Systems," Proc. Of Global Telecommunications Conference, San Francisco, CA, vol. 2, pp. 1000-1004, Nov. 27-Dec. 1, 2000.

X. Ma and G.B. Giannakis, "Space-Time Coding for Doubly-Selective Channels," Proc. Of Intl. Conf. On Circuits and Systems, Scottsdale, AZ, May 25-29, 2002, pp. III-647-III-650.

X. Ma and G.B. Giannakis, "Maximum-Diversity Transmissions over Time-Selective Wireless Channels," Proc. of Wireless Communications and Networking Conf., Orlando, FL, Mar. 17-21, 2002, pp. 497-501.

X. Ma and G.B. Giannakis, "Maximum-Diversity Transmissions Over Doubly Selective Wireless Channels," IEEE Transactions On Information Theory, vol. 49, No. 7, pp. 1832-1840, Jul. 2003.

X. Ma, C. Tepedelenlioglu, G.B. Giannakis, and S. Barbarossa, "Non-Data-Aided Carrier Offset Estimators for OFDM With Null Subcarriers: Identifiability, Algorithms, and Performance," IEEE Journal on Selected Areas in Communications, vol. 19, No. 12, pp. 2504-2515, Dec. 2001.

J. Mahdavi and S. Floyd, "TCP-Friendly Unicast Rate-Based Flow Control," Jan. 1997, http://www.psc.edu/networking/papers/tcp_friendly.html.

M. Martone, "Wavelet-Based Separating Kernels for Sequence Estimation with Unknown Rapidly Time-Varying Channels," IEEE Communications Letters, vol. 3, No. 3, pp. 78-80, Mar. 1999.

M. Mathis, J. Semke, J. Mahdavi, and T. Ott, "The Macroscopic Behavior of the TCP Congestion Avoidance Algorithm," Computer Communication Review, Vo. 27, No. 3, Jul. 1997, pp. 1-16.

B. Muquet, M. de Courville, G.B. Giannakis, Z. Wang, and P. Duhamel, "Reduced Complexity Equalizers For Zero-Padded OFDM Transmission".

A.F. Naguib, "On The Matched Filter Bound of Transmit Diversity Techniques," IEEE International Conference on Communications, vol. 2, pp. 596-603, Helsinki, Finland, Jun. 11-14, 2001.

A. Narula, M.J. Lopez, M.D. Trott, and G.W. Wornell, "Efficient Use of Side Information in Multiple-Antenna Data Transmission over Fading Channels," IEEE Journal on Selected Areas In Communications, vol. 16, No. 8, pp. 1423-1436, Oct. 1998.

A. Narula, M.D. Trott, and G.W. Wornell, "Performance Limits of Coded Diversity Methods for Transmitter Antenna Arrays," IEEE Transactions On Information Theory, vol. 45, No. 7, pp. 2418-2433, Nov. 1999.

S. Ohno and G.B. Giannakis, "Optimal Training and Redundant Precoding for Block Transmissions With Application to Wireless OFDM," IEEE Transaction on Communications, vol. 50, No. 12, pp. 2113-2123, Dec. 2002.

M.F. Pop and N.C. Beaulieu, "Limitations of Sum-of-Sinusoids Fading Channel Simulators," IEEE Transactions On Communications, vol. 49, No. 4, pp. 699-708, Apr. 2001.

R. Rajaie, H. Yu, M. Handely, and D. Estrin, "Multimedia Proxy Caching Mechanism for Quality Adaptive Streaming Applications in the Internet," Technical report 99-709, Computer Science Department, USC.

R. Rajaie, M. Handely, and D. Estrin, "Quality Adapation for Congestion Controlled Video Playback over the Internet," in Proc. of SIGCOMM'99, pp. 1-16.

S. Sen, J. Rexford, and D. Towsley, "Proxy Prefix Caching for Multimedia Streams," in Proc. of IEEE INFOCOM'99.

L. Rizzo, IP Dummynet, pp. 1-9, http://info.iet.unipi.it/luigi/ip_dummynet/.

O. Rose, "Statistical Properties of MPEG Video Traffic and Their Impact on Traffic Modeling in ATM Network," TR-101, Institute of Computer Science, University of Wurzburg, Germany, Feb. 1995, pp. 1-25.

M. Rouanne and D.J. Costello, Jr., "An Algorithm for Computing the Distance Spectrum of Trellis Codes," IEEE Journal on Selected Areas in Communications, vols. 7, No. 6, pp. 929-940, Aug. 1989.

A. Ruiz, J.M. Cioffi, and S. Kasturia, "Discrete Multiple Tone Modulation with Coset Coding for the Spectrally Shaped Channel," IEEE Transactions on Communications, vol. 40, No. 6, pp. 1012-1029, Jun. 1992.

H.R. Sadjadpour, "Application of Turbo Codes for Discrete Multi-Tone Modulation Schemes," in Proc. Of Intl. Conf. On Com., Vancouver, Canada, 1999, vol. 2, pp. 1022-1027.

A.M. Sayeed and B. Aazhang, "Joint Multipath-Doppler Diversity in Mobile Wireless Communications," IEEE Transactions On Communications, vol. 47, No. 1, pp. 123-132, Jan. 1999.

D.-S. Shiu, G.J. Foschini, M.J. Gans, and J.M. Kahn, "Fading Correlation and Its Effect on the Capacity of Multielement Antenna Systems," IEEE Transactions on Communications, vol. 48, No. 3, pp. 502-513, Mar. 2000.

A. Stamoulis, G.B. Giannakis, and A. Scaglione, "Block FIR Decision-Feedback Equalizers for Filterbank Precoded Transmissions with Blind Channel Estimation Capabilities," IEEE Transactions On Communications, vol. 49, No. 1, pp. 69-83, Jan. 2001.

L. Sylla, P. Fortier, and H.T. Huynh, "Performance of COFDM Using Turbo Codes," in Proc. Of IEEE Canadian Conference on Electrical and Computer Engineering, Edmonton, Alta, Canada, May 9-12, 1999.

V. Tarokh, H. Jafarkhani, and A.R. Calderbank, "Space-Time Block Codes from Orthogonal Designs," IEEE Transactions On Information Theory, vol. 45, No. 5, pp. 1456-1467, Jul. 1999.

C. Tepedelenlioglu and G.B. Giannakis, "Transmitter Redundancy for Blind Estimation and Equalization of Time- Frequency-Selective Channels," IEEE Transactions On Signal Processing, vol. 48, No. 7, pp. 2029-2043, Jul. 2000.

M.K. Tsatsanis and G.B. Giannakis, "Modelling and Equalization of Rapidly Fading Channels," International Journal of Adaptive Control and Signal Processing, vol. 10, pp. 159-176, 1996.

E. Visotsky and U. Madhow, "Space-Time Transmit Precoding With Imperfect Feedback," IEEE Transactions on Information Theory, vol. 47, No. 6, pp. 2632-2639, Sep. 2001.

A.J. Viterbi, "An Intuitive Justification and a Simplified Implementation of the MAP Decoder for Convolutional Codes," IEEE Journal on Selected Areas in Communications, vol. 16, No. 2, pp. 260-264, Feb. 1998.

E. Viterbo, and J. Boutros, "A Universal Lattice Code Decoder for Fading Channels," IEEE Transactions on Information Theory, vol. 45, No. pp. 1639-1642, Jul. 1999.

J. Vogt, K. Koora, A. Finger, and G. Fettweis, "Comparison of Different Turbo Decoder Realizations For IMT-2000," in Global Telecommunications Conference—GLOBECOM'99, Rio de Janeiro, Brazil, 1999, vol. 5, pp. 2704-2708.

F.W. Vook and T.A. Thomas, "Transmit Diversity Schemes for Broadband Mobile Communication Systems," Proc. Of Vehicular Tech. Conf., vol. 6, pp. 2523-2529, Boston MA, Sep. 24-28, 2000.

H. Wang, J. Belzile, and C.L. Despins, "64-QAM OFDM With TCM Coding and Waveform Shaping In A Time-Selective Rician Facing Channel," in Proc. Of Int'l Zurich Seminar on Broadband Comm., Berdun, Que., Canada, 2000, pp. 257-261.

X. Wang and H.V. Poor, "Iterative (Turbo) Soft Interface Cancellation and Decoding for Coded CDMA," IEEE Transactions on Communications, vol. 47, No. 7, pp. 1046-1061, Jul. 1999.

Y. Wang, Z.-L. Zhang, D. Du, and D. Su, "A Network-Conscious Approach to End-to-End Video Delivery Over Wide Area Networks Using Proxy Servers," in Proceedings of IEEE INFOCOM'98.

Z. Wang, S. Zhou, and G.B. Giannakis, "Joint Coding-Precoding with Low Complexity Turbo-Decoding," IEEE Transactions on Wireless Communications, vol. XXX, No. XXX, pp. 1-11, Month 2003; also in Proc. Of the European Wireless Conference, Florence, Italy, Feb. 25-28.

Z. Wang and G.B. Giannakis, "Lineraly Precoded or Coded OFDM against Wireless Channel Fades?" in Third IEEE Signal Processing Workshop on Signal Processing Advances in Wireless Communication, Taoyuan, Taiwan, Mar. 20-23, 2001.

Z. Wang and G.B. Giannakis, "Complex-Field Coding for OFDM Over Fading Wireless Channels" IEEE Transactions on Information Theory, vol. 49, No. 3, pp. 707-720, Mar. 2003.

Z. Wang and G.B. Giannakis, "Wireless Multicarrier Communications: Where Fourier Meets Shannon," IEEE Signal Processing Magazine, vol. 17, No. 3, pp. 29-48, May 2000.

A. Wiineben, "A New Bandwidth Efficient Transmit Antenna Modulation Diversity Scheme for Linear Digital Modulation," Proc. of IEEE International Conference on Comm., vol. 3, pp. 1630-1634, Geneva, Switzerland, May 23-26, 1993.

Y. Xin, Z. Wang, and G.B. Giannakis, "Space-Time Constellation-Rotating Codes Maximizing Diversity and Coding Gains," Proc. Of GLOBECOM, vol. 1, pp. 455-459 San Antonio, TX, Nov. 25-27, 2001.

Q. Yan and R.S. Blum, "Robust Space-Time Block Coding for Rapid Fading Channels," IEEE Global Telecommunications Conference, vol. 1, pp. 460-464, San Antonio, TX, Nov. 25-29, 2001.

Z.-L. Zhang, S. Nelakuditi, R. Aggarwal, and R. Tsang, "Efficient Selective Frame Discard Algorithms for Stored Video Delivery across Resource Constrained Networks," in Proc. of IEEE INFOCOM'99, pp. 1-26.

S. Zhou, G.B. Giannakis, and C. Le Martret "Chip-Interleaved Block-Spread Code Division Multiple Access," IEEE Transactions On Communications, vol. 50, No. 2, pp. 235-248, Feb. 2002.

S. Zhou and G.B. Giannakis, "Optimal Transmitter Eigen-Beamforming and Space-Time Block Coding Based on Channel Correlations," IEEE Trans. Signal processing, vol. 50, No. 10, pp. 553-557, Oct. 2002.

S. Zhou and G.B. Giannakis, "Space-Time Coding With Maximum Diversity Gains Over Frequency-Selective Fading Channels," IEEE Signal Processing Letters, vol. 8, No. 10, pp. 369-272, Oct. 2001.

S. Zhou, Z. Wang, N. Bapat, G.B. Giannakis, "Turbo Decoding of Error Control Coded and Unitary Precoded OFDM", pp. 1237-1241, University of Minnesota.

S. Zhou, B. Muquet, and G.B. Giannakis, "Subspace-Based (Semi-) Blind Channel Estimation for Block Precoded Space-Time OFDM," IEEE Transactions on Signal Processing, vol. 50, No. 5, pp. 1215-1228, May 2002.

K.R. Narayanan et al., "Low Complexity Turbo Equalization with Binary Precoding," 5 pages, IEEE, 2000.

W.W. Peterson et al., *Error-Correcting Codes*, Second Edition, MIT Press 1972, pp. 125, 129-131, 556.

G.C. Clark, Jr. et al., *Error-Correction Coding for Digital Communications*, Plenum Press, pp. 9, 10, 420.

* cited by examiner

WIRELESS COMMUNICATION SYSTEM HAVING LINEAR ENCODER

This application claims priority from U.S. Provisional Application Ser. No. 60/374,886, filed Apr. 22, 2002, U.S. Provisional Application Ser. No. 60/374,935, filed Apr. 22, 2002, U.S. Provisional Application Ser. No. 60/374,934, filed Apr. 22, 2002, U.S. Provisional Application Ser. No. 60/374,981, filed Apr. 22, 2002, U.S. Provisional Application Ser. No. 60/374,933, filed Apr. 22, 2002, the entire contents of which are incorporated herein by reference.

STATEMENT REGARDING FEDERALLY SPONSORED RESEARCH OR DEVELOPMENT

This invention was made with Government support under Contract No. ECS-9979443, awarded by the National Science Foundation, and Contract No. DAAG55-98-1-0336 (University of Virginia Subcontract No. 5-25127) awarded by the U.S. Army. The Government may have certain rights in this invention.

TECHNICAL FIELD

The invention relates to communication systems and, more particularly, transmitters and receivers for use in wireless communication systems.

BACKGROUND

In wireless mobile communications, a channel that couples a transmitter to a receiver is often time-varying due to relative transmitter-receiver motion and multipath propagation. Such a time-variation is commonly referred to as fading, and may severely impair system performance. When a data rate for the system is high in relation to channel bandwidth, multipath propagation may become frequency-selective and cause intersymbol interference (ISI). By implementing Inverse Fast Fourier Transform (IFFT) at the transmitter and FFT at the receiver, Orthogonal Frequency Division Multiplexing (OFDM) converts an ISI channel into a set of parallel ISI-free subchannels with gains equal to the channel's frequency response values on the FFT grid. Each subchannel can be easily equalized by a single-tap equalizer using scalar division.

To avoid inter-block interference (IBI) between successive IFFT processed blocks, a cyclic prefix (CP) of length greater than or equal to the channel order is inserted per block at the transmitter and discarded at the receiver. In addition to suppressing IBI, the CP also converts linear convolution into cyclic convolution and thus facilitates diagonalization of an associated channel matrix.

Instead of having multipath diversity in the form of (superimposed) delayed and scaled replicas of the transmitted symbols as in the case of serial transmission, OFDM transfers the multipath diversity to the frequency domain in the form of (usually correlated) fading frequency response. Each OFDM subchannel has its gain being expressed as a linear combination of the dispersive channel taps. When the channel has nulls (deep fades) close to or on the FFT grid, reliable detection of the symbols carried by these faded subcarriers becomes difficult if not impossible.

Error-control codes are usually invoked before the IFFT processing to deal with the frequency-selective fading. These include convolutional codes, Trellis Coded Modulation (TCM) or coset codes, Turbo-codes, and block codes (e.g., Reed-Solomon or BCH). Such coded OFDM schemes often incur high complexity and/or large decoding delay. Some of these schemes also require Channel State Information (CSI) at the transmitter, which may be unrealistic or too costly to acquire in wireless applications where the channel is rapidly changing. Another approach to guaranteeing symbol detectability over ISI channels is to modify the OFDM setup: instead of introducing the CP, each IFFT-processed block can be zero padded (ZP) by at least as many zeros as the channel order.

SUMMARY

In general, techniques are described for robustifying multi-carrier wireless transmissions, e.g., OFDM, against random frequency-selective fading by introducing memory into the transmission with complex field (CF) encoding across the subcarriers. Specifically, instead of sending a different uncoded symbol per subcarrier, the techniques utilize different linear combinations of the information symbols on the subcarriers. These techniques generalize signal space diversity concepts to allow for redundant encoding. The CF block code described herein can also be viewed as a form of real-number or analog codes.

The encoder described herein is referred to as a "Linear Encoder (LE),"0 and the corresponding encoding process is called "linear encoding," also abbreviated as LE when no confusions arise. The resulting CF coded OFDM will be called LE-OFDM. In one embodiment, the linear encoder is designed so that maximum diversity order can be guaranteed without an essential decrease in transmission rate.

By performing pairwise error probability analysis, we upper bound the diversity order of OFDM transmissions over random frequency-selective fading channels. The diversity order is directly related to a Hamming distance between the coded symbols. Moreover, the described LE can be designed to guarantee maximum diversity order irrespective of the information symbol constellation with minimum redundancy. In addition, the described LE codes are maximum distance separable (MDS) in the real or complex field, which generalizes the well-known MDS concept for Galois field (GF) codes. Two classes of LE codes are described that can achieve MDS and guarantee maximum diversity order: the Vandermonde class, which generalizes the Reed-Solomon codes to the real/complex field, and the Cosine class, which does not have a GF counterpart.

Several possible decoding options have been described, including ML, ZF, MMSE, DFE, and iterative detectors. Decision directed detectors may be used to strike a trade-off between complexity and performance.

In one embodiment, a wireless communication device comprises an encoder that linearly encodes a data stream to produce an encoded data stream, and a modulator to produce an output waveform in accordance with the encoded data stream for transmission through a wireless channel.

In another embodiment, a wireless communication device comprises a demodulator that receives a waveform carrying a linearly encoded transmission and produces a demodulated data stream, and a decoder that applies decodes the demodulated data and produce estimated data.

In another embodiment, a method comprises linearly encoded a data stream with to produce an encoded data stream, and outputting a waveform in accordance with the data stream for transmission through a wireless channel.

In another embodiment, a computer-readable medium comprises instructions to cause a programmable processor to linearly encode a data stream with to produce an encoded data stream, and output a waveform in accordance with the data stream for transmission through a wireless channel.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
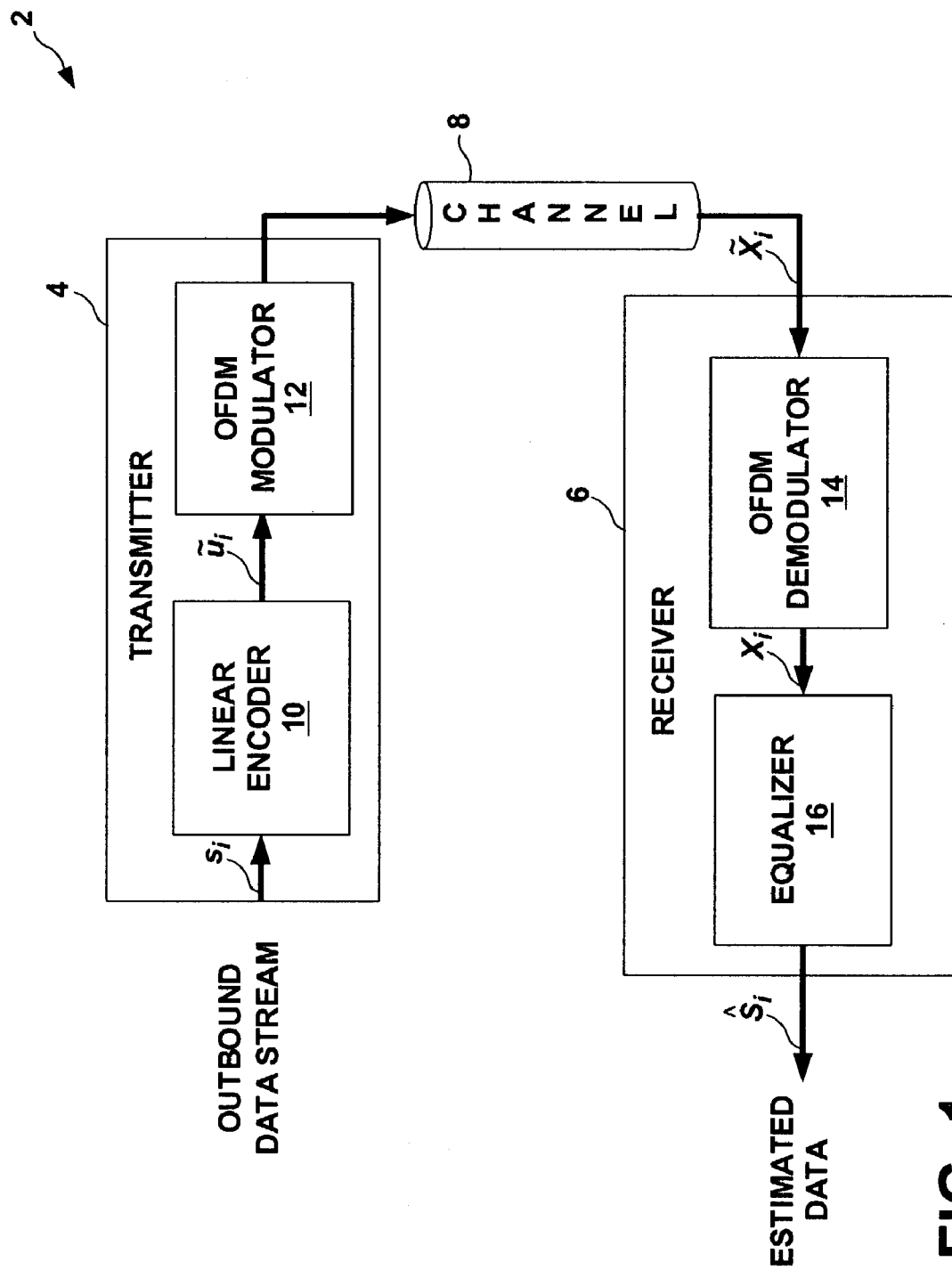
FIG. 1 is a block diagram illustrating an exemplary wireless communication system in which a transmitter and receiver implement linear precoding techniques.

FIG. 1 is a block diagram illustrating a telecommunication system 2 in which transmitter 4 communicates data to receiver 6 through wireless channel 8. Transmitter 4 transmits data to receiver 6 using one of a number of conventional multi-carrier transmission formats including Orthogonal Frequency Division Multiplexing (OFDM). OFDM has been adopted by many standards including digital audio and video broadcasting (DAB, DVB) in Europe and high-speed digital subscriber lines (DSL) in the United States. OFDM has also been proposed for local area mobile wireless broadband standards including IEEE802.11a, MMAC and HIPERLAN/2. In one embodiment, system 2 represents an LE-OFDM system having N subchannels.

In general, the techniques described herein robustify multi-carrier wireless transmissions, e.g., OFDM, against random frequency-selective fading by introducing memory into the transmission with complex field (CF) encoding across the subcarriers. In particular, transmitter 4 utilizes different linear combinations of the information symbols on the subcarriers. The techniques described herein may be applied to uplink and/or downlink transmissions, i.e., transmissions from a base station to a mobile device and vice versa. Consequently, transmitters 4 and receivers 6 may be any device configured to communicate using a multi-user wireless transmission including a cellular distribution station, a hub for a wireless local area network, a cellular phone, a laptop or handheld computing device, a personal digital assistant (PDA), and the like.

In the illustrated embodiment, transmitter 4 includes linear encoder 10 and an OFDM modulator 12. Receiver 6 includes OFDM demodulator 14 and equalizer 16. Due to CP-insertion at transmitter 44 and CP-removal at receiver 6, the dispersive channel 8 is represented as an N×N circulant matrix $\tilde{H}$, with $[\tilde{H}]_{i,j}=h((i-j) \bmod N)$, where $h(\cdot)$ denotes the impulse response of channel 8:

$$H = \begin{bmatrix} h(0) & 0 & \cdots & 0 & h(L) & \cdots & h(1) \\ \vdots & h(0) & 0 & \cdots & & \ddots & \vdots \\ & & & & & & h(L) \\ h(L) & \vdots & \ddots & \ddots & & \cdots & 0 & 0 \\ 0 & h(L) & & \ddots & 0 & & & 0 \\ \vdots & 0 & & & h(0) & \ddots & & \vdots \\ & \vdots & \ddots & \ddots & \vdots & \ddots & & 0 \\ 0 & \cdots & & 0 & h(L) & & \cdots & h(0) \end{bmatrix} \quad (1)$$

We assume the channel to be random FIR, consisting of no more than L+1 taps. The blocks within the dotted box represent a conventional uncoded OFDM system.

Let F denote the N×N FFT matrix with entries $[F]_{n,k}=(1/\sqrt{N})\exp(-j2\pi nk/N)$. Performing IFFT (postmultiplication with the matrix $F^H$) at the transmitter and FFT (premultiplication with the matrix F) at the receiver diagonalizes the circulant matrix $\tilde{H}$. So, we obtain the parallel ISI-free model for the ith OFDM symbol as (see FIG. 1): $x_i = D_H u_i + \eta_i$, where $$D_H := diag\left[ H(j0) . H\left(j2\pi \frac{1}{N}\right), \ldots, H\left(j2\pi \frac{N-1}{N}\right)\right] = F^{\mathcal{H}} \tilde{H} F,$$

with $H(j\omega)$ denoting the channel frequency response at $\omega$; and $\eta_i = F \tilde{\eta}_i$ standing for the FFT-processed additive white Gaussian noise (AWGN).

In order to exploit the frequency-domain diversity in OFDM, our LE-OFDM design first linearly encodes (i.e., maps) the K≤N symbols of the ith block, $s_i \in \mathcal{S}$, where $\mathcal{S}$ is the set of all possible vectors that $s_i$ may belong to (e.g., the BPSK set $\{\pm 1\}^{K \times 1}$), by an N×K matrix $\Theta \in \mathbb{C}^{N \times K}$ and then multiplexes the coded symbols $u_i = \Theta s_i \in \mathbb{C}^{N \times 1}$ using conventional OFDM. In practice, the set $\mathcal{S}$ is always finite. But we allow it to be infinite in our performance analysis. The encoder $\Theta$ considered here does not depend on the OFDM symbol index i. Time-varying encoder may be useful for certain purposes (e.g., power loading), but they will not be pursued here. Hence, from now on, we will drop our OFDM symbol index i for brevity.

Notice that the matrix-vector multiplication used in defining $u=\Theta s$ takes place in the complex field, rather than a Galois field. The matrix $\Theta$ can be naturally viewed as the generating matrix of a complex field block code. The codebook is defined as $\mathcal{U}:=\{\Theta s | s \in \mathcal{S}\}$. By encoding a length-K vector to a length-N vector, some redundancy is introduced that we quantify by the rate of the code defined to be r=K/N, reminiscent of the GF block code rate definition. The set $\mathcal{U}$ is a subset of the $\mathbb{C}^{N \times 1}$ vector space. More specifically, $\mathcal{U}$ is a subset of the K dimensional subspace spanned by the columns of $\Theta$. When $\mathcal{S}=\mathbb{Z}^{K \times 1}$, the set $\mathcal{U}$ forms a lattice.

Combining the encoder with the diagonalized channel model, the ith received block after CP removal and FFT processing can be written as:

$$x=F\tilde{x}=F(\tilde{H}F^H \Theta s + \tilde{\eta})=D_H \Theta s + \eta. \quad (2)$$

We want to design $\Theta$ so that a large diversity order can be guaranteed irrespective of the constellation that the entries of $s_i$ are drawn from, with a small amount of introduced redundancy.

We can conceptually view Θ together with the OFDM modulation $F^H$ as a combined N×K encoder $\tilde{\Theta}:=F^H\Theta$, which in a sense blends the single-carrier and multicarrier notions. Indeed, by selecting Θ, hence $\tilde{\Theta}$, the system in FIG. 1 can describe various single and multicarrier systems, some of them are provided shortly as special cases of our LE-OFDM. The received vector $\tilde{x}$ is related to the information symbol vector s through the matrix product $\tilde{H}\Theta$.

We define the Hamming distance δ(u, u') between two vectors u and u' as the number of non-zero entries in the vector $u_c$=u−u' and the minimum Hamming distance of the set $\mathcal{U}$ as $\delta_{min}(\mathcal{U}):=\min\{\delta(u, u')|u, u\in\mathcal{U}\}$. When there is no confusion, we will simply use $\delta_{min}$ for brevity. The minimum Euclidean distance between vectors in $\mathcal{U}$ is denoted as $d_{min}(\mathcal{U})$ or simply $d_{min}$.

Because such encoding operates in the complex field, it does not increase the dimensionality of the signal space. This is to the contrasted to the GF encoding: the codeword set of a GF (n, k) code, when viewed as a real/complex vector, in general has a higher dimensionality (n) than does the original uncoded block of symbols (k). Exceptions include the repetition code, for which the codeword set has the same dimensionality as that of the input.

EXAMPLE 1

Consider the binary (3, 2) block code generated by the matrix $$\begin{bmatrix} 1 & 0 & 1 \\ 0 & 1 & 1 \end{bmatrix}^T \quad (3)$$

followed by BPSK constellation mapping (e.g., 0→−1 and 1→1). The codebook consists of 4 codewords $$[-1\ -1\ -1]^T, [1\ -1\ 1]^T, [-1\ 1\ 1]^T, [1\ 1\ -1]^T. \quad (4)$$

Figure 2A:
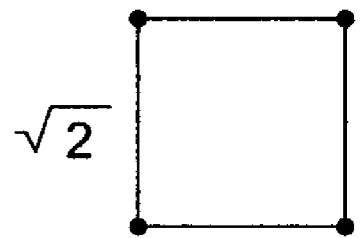
FIGS. 2A, 2B illustrate uncoded and GF-coded BPSK signals.
Figure 2B:
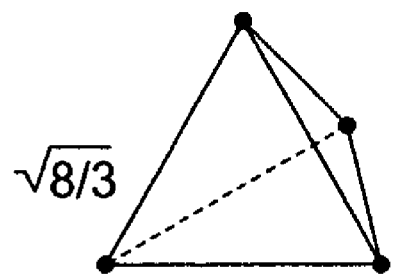

These codewords span the $R^{3\times1}$ (or $C^{3\times1}$) space and therefore the codebook has dimension 3 in the real or complex field, as illustrated in FIG. 2.

In general, a (n, k) binary GF block code is capable of generating $2^k$ codewords in an n-dimensional space $R^{n\times1}$ or $C^{n\times1}$. If we view the transmit signal design problem as packing spheres in the signal space (Shannon's point of view), an (n, k) GF block code followed by constellation mapping packs spheres in an n-dimensional space and thus has the potential to be better (larger sphere radius) than a k-dimensional packing. In our example above, if we normalize the codewords by a factor $\sqrt{2/3}$ so that the energy per bit $E_b$ is one, the 4 codewords have mutual Euclidean distance $\sqrt{8/3}$, larger than the minimum distance $\sqrt{2}$ of the uncoded BPSK signal set (±1,±1). This increase in minimum Euclidean distance leads to improved system performance in AWGN channels, at least for high signal to noise ratio (SNR). For fading channels, the minimum Hamming distance of the codebook dominates high SNR performance in the form of diversity gain (as will become clear later). The diversity gain achieved by the (3, 2) block code in the example is the minimum Hamming distance 2.

CF linear encoding on the other hand, does not increase signal dimension; i.e., we always have dim(U)≦dim(S). When Θ has full column rank K, dim(U)=dim(S), in which case the codewords span a K-dimensional subspace of the N-dimensional vector space $C^{K\times1}$. In terms of sphere packing, CF linear encoding does not yield a packing of dimension higher than K.

We have the following assertion about the minimum Euclidean distance.

Proposition 1 Suppose tr(ΘΘ$^H$)=K. If the entries of s∈$\mathcal{S}$ are drawn independently from a constellation $\mathcal{A}$ of minimum Euclidean distance of $d_{min}$ ($\mathcal{A}$) then the codewords in u:={Θs|s∈$\mathcal{S}$} have minimum Euclidean distance no more than $d_{min}$($\mathcal{A}$).

Proof: Under the power constraint tr(ΘΘ$^H$)=K, at least one column of Θ will have norm no more than 1. Without loss of generality, suppose the first column has norm no more than 1. Consider $s_\alpha$=(α, 0, . . . , 0)$^T$ and $s_\beta$=(β, 0, . . . , 0)$^T$, where α and β are two symbols from the constellation that are separated by $d_{min}$. The coded vectors $u_\alpha$=Θ$s_\alpha$ and $u_\beta$=Θ$s_\beta$ are then separated by a distance no more than $d_{min}$.

Due to Proposition 1, CF linear codes are not effective for improving performance for AWGN channels. But for fading channels, they may have an advantage over GF codes, because they are capable of producing codewords that have large Hamming distance.

EXAMPLE 2

The encoder $$\Theta = \sqrt{\frac{4}{15}} \begin{bmatrix} 1 & 1 & 1 \\ 0.5 & -0.5 & 0.5 \end{bmatrix}^T, \quad (5)$$

operating on BPSK signal set $\mathcal{S}=\{\pm1\}^2$, produces 4 codewords of minimum Euclidean distance $\sqrt{4/5}$ and minimum Hamming distance 3. Compared with the GF code in Example 1, this real code has smaller Euclidean distance but larger Hamming distance. In addition, the CF coding scheme described herein differs from the GF block coding in that the entries of the LE output vector u usually belong to a larger, although still finite, alphabet set than do the entries of the input vector s.

Before exploring optimal designs of Θ, let us first look at some special cases of the LE-OFDM system.

By setting K=N and Θ=$I_N$, we obtain the conventional uncoded OFDM model. In such a case, the one-tap linear equalizer matrix $\Gamma=D_H^{-1}$ yields $\hat{s}=\Gamma x=s+D_H^{-1}\eta$, where the inverse exists when the channel has no nulls on the FFT grid. Under the assumption that $\tilde{n}$ (hence η) is AWGN, such an equalizer followed by a minimum distance quantizer is optimum in the maximum-likelihood (ML) sense for a given channel when CSI has been acquired at the receiver. But when the channel has nulls on (or close to) the FFT grid ω−2πn/N, n=0, . . . , N−1, the matrix $D_H$ will be ill-conditioned and serious noise-amplification will emerge if we try to invert $D_H$ (the noise variance can become unbounded). Although events of channel nulls being close to the FFT grid have relatively low probability, their occurrence is known to have dominant impact on the average system performance especially at high SNR. Improving the performance of an uncoded transmission thus relies on robustifying the system against the occurrence of such low-probability but catastrophic events. If CSI is available at the transmitter, power and bit loading can be used and channel nulls can be avoided, such as in discrete multi-tone (DMT) systems.

Figure 3:
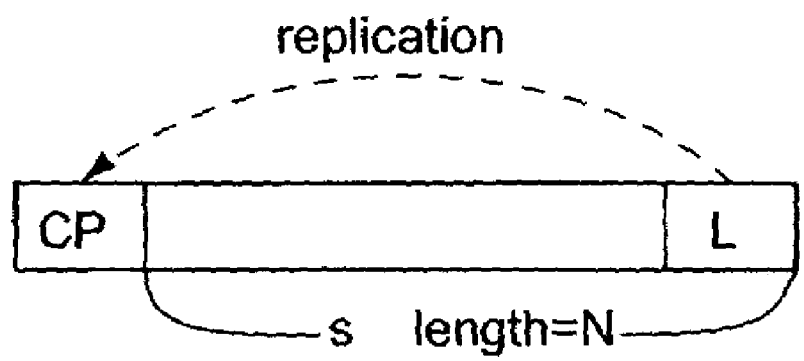
FIG. 3 illustrates an example format of a transmission block for CP-only transmissions by the transmitter of FIG. 1.
Figure 4:
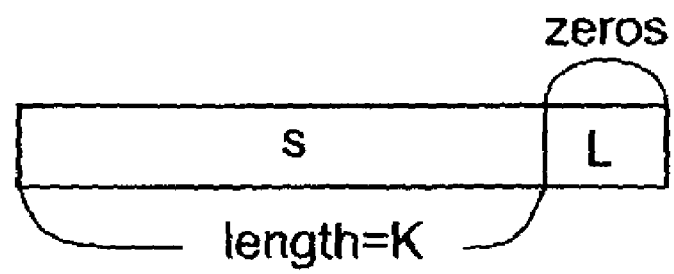
FIG. 4 illustrates an example format of a transmission block for ZP-only transmissions by the transmitter of FIG. 1.

If we choose K=N and Θ=F, then since $F^H F=I_N$, the IFFT $F^H$ reverses the encoding and the resulting system is a single-carrier block transmission with CP insertion (c.f., FIG. 3): $\tilde{x}=\tilde{H}s+\tilde{\eta}$. The FFT at the receiver is no longer necessary.

Let K=N−L. We choose Θ to be an N×K truncated FFT matrix (the first K columns of F); i.e., $[\Theta]_{n,k}=(1/\sqrt{N})\exp(-j2\pi nk/N)$. It can be easily verified that $F^H \Theta=[I_K, 0_{K\times L}]^T:=T_{zp}$, where $0_{K\times L}$ denotes a K×L all-zero matrix, and the subscript "zp" stands for zero-padding (ZP). The matrix $T_{zp}$ simply pads zeros at the tail of s and the zero-padded block $\tilde{u}=T_{zp}s$ is transmitted. Notice that $H:=\tilde{H}F^H\Theta=\tilde{H}T_{zp}$ is an N×K Toeplitz convolution matrix (the first K columns of $\tilde{H}$), which is always full rank. The symbols s can thus always be recovered from the received signal $\tilde{x}=Hs+\tilde{n}$ (perfectly in the absence of noise) and no catastrophic channels exist in this case. The cyclic prefix in this case consists of L zeros, which, together with the L zeros from the encoding process, result in 2L consecutive zeros between two consecutive uncoded information blocks of length K. But only L zeros are needed in order to separate the information blocks. CP is therefore not necessary because the L zeros created by Θ already separate successive blocks.

ZP-only transmission is essentially a simple single-carrier block scheme. However, viewing it as a special case of the LE-OFDM design will allow us to apply the results about LE-OFDM and gain insights into its performance. It turns out that this special case is indeed very special: it achieves the best high-SNR performance among the LE-OFDM class.

To design linear encoder 10 with the goal of improving performance over uncoded OFDM, we utilize pair-wise error probability (PEP) analysis technique. For simplicity, we will first assume that As1) The channel $h:=[h(0), h(1), \ldots, h(L)]^T$ has independent and identically distributed (i.i.d.) zero-mean complex Gaussian taps (Rayleigh fading). The corresponding correlation matrix of h is $R_h:=E[hh^H]=\alpha_L^2 I_{L+1}$, where the constant $\alpha_L:=1/(L+1)$.

Later on, we will relax this assumption to allow for correlated fading with possibly rank deficient autocorrelation matrix $R_h$.

We suppose ML detection with perfect CSI at the receiver and consider the probability $P(s\rightarrow s'|h)$, $s, s' \in \mathcal{S}$ that a vector s is transmitted but is erroneously decoded as $s'\neq s$. We define the set of all possible error vectors $\mathcal{S}_e:=\{e:=s-s'|s,s'\in\mathcal{S}, s\neq s'\}$.

The PEP can be approximated using the Chernoff bound as:

$$P(s\rightarrow s'|h) \leq \exp(-d^2(y,y')/4N_0), \quad (6)$$

where $N_0/2$ is the noise variance per dimension, $y:=D_H\Theta s$, $y':=D_H\Theta s'$, and $d(y,y')=\|y-y'\|$ is the Euclidean distance between y and y'.

Let us consider the N×(L+1) matrix V with entries $[V]_{n,l}=\exp(-j2\pi nl/N)$, and use it to perform the N-point discrete Fourier transform Vh of h. Note that $D_H=\text{diag}(Vh)$; i.e., the diagonal entries of $D_H$ are those in vector Vh. Using the definitions $e:=s-s'\in\mathcal{S}_e$, $u_e:=\Theta e$, and $D_e:=\text{diag}(u_e)$, we can write $y-y'=D_H u_e=\text{diag}(Vh)u_e$. Furthermore, we can express the squared Euclidean distance $d^2(y,y')=\|D_H u_e\|^2=\|D_e Vh\|^2$ as $$d^2(y,y')=h^H V^H D_e^H D_e Vh:=h^H A_e h. \quad (7)$$

An upper bound to the average PEP can be obtained by averaging (6) with respect to the random channel h to obtain:

$$P(s\rightarrow s') \leq \prod_{l=0}^{L}\frac{1}{1+\alpha_L\lambda_{e,l}/(4N_0)}, \quad (8)$$

where $\lambda_{e,0}, \lambda_{e,1}, \ldots, \lambda_{e,L}$ are the non-increasing eigenvalues of the matrix $A_e=V^H D_e^H D_e V$.

If $r_e$ is the rank of $A_e$, then $\lambda_{e,l}\neq 0$ if and only if $l\in[0,r_e-1]$. Since $1+\alpha_L\lambda_{e,l}/(4N_0)>\lambda_{e,l}/(4N_0)$, it follows from (8) that $$P(s\rightarrow s') \leq \left(\frac{1}{4N_0}\right)^{-r_e}\left(\prod_{l=0}^{r_e-1}\alpha_L\lambda_{e,l}\right)^{-1}. \quad (9)$$

We call $r_e$ the diversity order, denoted as $G_{d,e}$, and $(\prod_{l=0}^{r_e-1}\alpha_L\lambda_{e,l})^{1/r_e}$ the coding advantage, denoted as $G_{c,e}$, for the symbol error vector e. The diversity order $G_{d,e}$ determines the slope of the averaged (w.r.t. the random channel) PEP (between s and s') as a function of the SNR at high SNR ($N_0\rightarrow 0$). Correspondingly, $G_{c,e}$ determines the shift of this PEP curve in SNR relative to a benchmark error rate curve of $(1/4N_0)^{-r_e}$. When $r_e=L+1$, $A_e$ is full rank, the product of eigen-values becomes the determinant of $A_e$ and therefore the coding advantage is given by $\alpha_L[\det(A_e)]^{1/(L+1)}$.

Since both $G_{d,e}$ and $G_{d,c}$ depend on the choice of e, we define the diversity order and coding advantages for our LE-OFDM system, respectively, as:

$$G_d := \min_{e\in\mathcal{S}_e} G_{d,e} = \min_{e\in\mathcal{S}_e} \text{rank}(A_e), \text{ and } G_c := \min_{e\in\mathcal{S}_e} G_{c,e}. \quad (10)$$

We refer to diversity order herein to mean the asymptotic slope of the error probability versus SNR curve in a log-log scale. Often, "diversity" refers to "channel diversity," i.e., roughly the degree of freedom of a given channel. To attain a certain diversity order (slope) on the error probability versus SNR curve, three conditions may be satisfied: i) Transmitter 4 is well-designed so that the information symbols are encoded with sufficient redundancy (enough diversification); ii) Channel 8 is capable of providing enough degrees of freedom; iii) Receiver 4 is well designed so as to sufficiently exploit the redundancy introduced at the transmitter.

Since the diversity order $G_d$ determines how fast the symbol error probability drops as SNR increases, $G_d$ is to be optimized first.

We have the following theorem.

Theorem 1 (Maximum Achievable Diversity Order): For a transmitted codeword set $\mathcal{U}$ with minimum Hamming distance $\delta_{min}$, over i.i.d. FIR Rayleigh fading channels of order L, the diversity order is $\min(\delta_{min}, L+1)$. Thus, the Maximum Achievable Diversity Order (MADO) of LE-OFDM transmissions is L+1 and in order to achieve MADO, we need $\delta_{min}\geq L+1$.

Proof: Since matrix $A_e=V^H D_e^H D_e V$ in (7) is the Gram matrix of $D_e V$, the rank $r_e$ of $A_e$ is the same as the rank of $D_e V$, which is $\min(\delta(u, u'), L+1) \leq L+1$. Therefore, the diversity order of the system is $$G_d = \min_{e \in \mathcal{S}_e} \operatorname{rank}(A_e) = \min_{e \in \mathcal{S}_e} \min[\delta(u, u'), L+1] = \min(\delta_{\min}, L+1) \leq L+1,$$

and the equality is achieved when $\delta_{min} \geq L+1$.

Theorem 1 is intuitively reasonable because the FIR Rayleigh fading channel offers us L+1 independent fading taps, which is the maximum possible number of independent replicas of the transmitted signal in the serial transmission mode. In order to achieve the MADO, any two codewords in $\mathcal{U}$ should be different by no less than L+1 entries.

The results in Theorem 1 can also be applied to GF-coded/interleaved OFDM systems provided that channel coding or interleaving is applied only within an OFDM symbol and not across successive OFDM symbols. The diversity is again the minimum of the minimum Hamming distance of the code and L+1. To see this, it suffices to view $\mathcal{U}$ as the codeword set of GF-coded blocks.

To achieve MADO, we need $A_e$ to be full rank and thus positive definite for any $e \in \mathcal{S}_e$. This is true if and only if $h^H A_e h > 0$ for any $h \neq 0 \in C^{L+1}$. Equation (7) shows that this is equivalent to $d^2(y, y') = \|D_H \Theta e\|^2 \neq 0$, $\forall e \in \mathcal{S}_e$, and $\forall h \neq 0$. The latter means that any two different transmitted vectors should result in different received vectors in the absence of noise, irrespective of the channel; in such cases, we call the symbols detectable or recoverable. The conditions for achieving MADO and channel-irrespective symbol detectability are summarized in the following theorem:

Theorem 2 (Symbol Detectability $\Leftrightarrow$ MADO): Under the channel conditions of Theorem 1, the maximum diversity order is achieved if and only if symbol detectability is achieved; i.e., $\|D_H \Theta c\|^2 \neq 0$, $\forall e \in \mathcal{S}_e$ and $\forall h \neq 0$.

The result in Theorem 2 is somewhat surprising: it asserts the equivalence of a deterministic property of the code, namely symbol detectability in the absence of noise, with a statistical property, the diversity order. It can be explained though, by realizing that in random channels, the performance is mostly affected by the worst channels, despite their small realization probability. By guaranteeing detectability for any, and therefore the worst, channels, we are essentially improving the ensemble performance.

The symbol detectability condition in Theorem 2 should be checked against all pairs s and s', which is usually not an easy task, especially when the underlying constellations are large and/or when the size K of s is large. But it is possible to identify sufficient conditions on $\Theta$ that guarantee symbol detectability and that are relatively easy to check. One such condition is provided by the following theorem.

Theorem 3 (Sufficient Condition for MADO): For i.i.d. FIR Rayleigh fading channels of order L, MADO is achieved when $\operatorname{rank}(D_H \Theta) = K$, $\forall h \neq 0$, which is equivalent to the following condition: Any N–L rows of $\Theta$ span the $C^{1 \times K}$ space. The latter in turn implies that $N - L \geq K$.

Proof: First of all, since $\Theta$ is of size N×K, it can not have rank greater than K. If MADO is not achieved, there exists at least one channel h and $e \in \mathcal{S}_e$ such that $D_H \Theta e = 0$ by Theorem 2, which means that $\operatorname{rank}(D_H \Theta) < K$. So, MADO is achieved when $D_H \Theta = K$. Secondly, since the diagonal entries of $D_H$ represent frequency response of the channel h evaluated at the FFT frequencies, there can be at most L zeros on the diagonal of $D_H$. In order that $\operatorname{rank}(D_H \Theta) = K$, $\forall h$, it suffices to have any N–L rows of $\Theta$ span the $C^{1 \times K}$ space. On the other hand, when there is a set of N–L rows of $\Theta$ that are linearly dependent, we can find a channel that has zeros at frequencies corresponding to the remaining L rows. Such a channel will make $\operatorname{rank}(D_H \Theta) < K$. This completes the proof.

The natural question that arises at this point is whether there exist LE matrices $\Theta$ that satisfy the conditions of Theorem 3. The following theorem constructively shows two classes of encoders that satisfy Theorem 3 and thus achieve MADO.

Theorem 4 (MADO-achieving encoders):

i) Vandermonde Encoders: Choose N points $\rho_n \in C$, n=0, 1, ..., N–1, such that $\rho_m \neq \rho_n$, $\forall n \neq n$. Let $\rho := [\rho_0, \rho_1, ..., \rho_{N-1}]^T$. Then the Vandermonde encoder $\Theta(\rho) \in C^{N \times K}$ defined by $[\Theta(\rho)]_{n,k} = \rho_n^k$ satisfies Theorem 3 and thus achieves MADO.

ii) Cosine Encoders: Choose N points $\phi_0, \phi_1, ..., \phi_{N-1} \in R$, such that $\phi_m \neq (2k+1)\pi$ and $\phi_m \pm \phi_n \neq 2k\pi$, $\forall m \neq n$, $\forall k \in Z$. Let $\phi := [\phi_0, \phi_1, ..., \phi_{N-1}]^T$. Then the real cosine encoder $\Theta(\phi) \in R^{N \times K}$ defined by $$[\Theta(\phi)]_{n,k} = \cos\left(k + \frac{1}{2}\right)\phi_n$$

satisfies Theorem 3 and thus achieves MADO.

Proof: We first prove that Vandermonde encoders in i) satisfy the conditions of Theorem 3. Any K rows of the matrix $\Theta(\rho)$ form a square Vandermonde matrix with distinct rows. Such a Vandermonde matrix is known to have a determinant different from 0. Therefore, any K rows of $\Theta(\rho)$ are linearly independent, which satisfies the conditions in Theorem 3.

To prove Part ii) of the theorem, we show that any K rows of the encoding matrix form a non-singular square matrix. Without loss of generality, we consider the matrix formed by the first K rows:

$$\Theta_1 := \begin{bmatrix} \cos\left(\frac{1}{2}\phi_0\right) & \cos\left(\frac{3}{2}\phi_0\right) & \cdots & \cos\left(\frac{2K-1}{2}\phi_0\right) \\ \cos\left(\frac{1}{2}\phi_1\right) & \cos\left(\frac{3}{2}\phi_1\right) & \cdots & \cos\left(\frac{2K-1}{2}\phi_1\right) \\ \vdots & \vdots & \vdots & \vdots \\ \cos\left(\frac{1}{2}\phi_{K-1}\right) & \cos\left(\frac{3}{2}\phi_{K-1}\right) & \cdots & \cos\left(\frac{2K-1}{2}\phi_{K-1}\right) \end{bmatrix} \quad (11)$$

Let us evaluate the determinant $\det(\Theta_1)$. Define $$z_n := \cos\left(\frac{1}{2}\phi_n\right).$$

Using Chebyshev polynomials of the first kind $$T_l(x) := \cos(l \cos^{-1} x) = \sum_{i=0}^{\lfloor l/2 \rfloor} \binom{l}{2i} x^{l-2i} (x^2 - 1)^i,$$

each entry $$\cos\left(\frac{2m+1}{2}\phi_n\right)$$

of $\Theta_1$ is a polynomial $T_{2m+1}(z_n)$ of order $2m+1$ of some $$z_n = \cos\left(\frac{1}{2}\phi_n\right).$$

The determinant $\det(\Theta_1)$ is therefore a polynomial in $z_0, \ldots, z_{K-1}$ of order $\Sigma_{n=1}^{K}(2n-1)=K^2$. It is easy to see that when $z_n=0$, or when $z_m=\pm z_n$, $m\neq n$, $\Theta_1$ has an all-zero row, or, two rows that are either the same or the negative of each other. Therefore, $z_n$, $z_m-z_n$, and $z_m+z_n$ are all factors of $\det(\Theta_1)$. So, $g(z_0, z_1, \ldots, z_{K-1}):=\Pi_n z_n \Pi_{m>n}(z_m^2-z_n^2)$ is also a factor of $\det(\Theta_1)$. But $g(z_0, z_1, \ldots, z_{K-1})$ is of order $K+K(K-1)=K^2$, which means that it is different from $\det(\Theta_1)$ by at most a constant. Using the leading coefficient[4] $2^{l-1}$ of $T_l(x)$, we obtain the constant as $\Pi_{n=1}^{K} 2^{2n-l-1}=2^{K(K-1)}$; that is, $\det(\Theta_1)=2^{K(K-1)} g(z_0, z_1, \ldots, z_{K-1})$.

Since $\phi_m\neq(2k+1)\pi$ and $\phi_m\pm\phi_n\neq 2k\pi$, $\forall m\neq n$, $\forall k\in Z$, none of $z_n$, $z_m-z_n$, and $z_m+z_n$ can be zero. Therefore, $\det(\Theta_1)\neq 0$ and $\Theta_1$ is non-singular. A similar argument can be applied to any $K$ rows of the matrix, and the proof is complete.

Notice that up to now we have been assuming that the channel consists of i.i.d. zero-mean complex Gaussian taps. Such a model is well suited for studying average system performance in wireless fading channels, but is rather restrictive since the taps may be correlated. For correlated channels, we have the following result.

Theorem 5 (MADO of Correlated Rayleigh Channels): Let the channel h be zero-mean complex Gaussian with correlation matrix $R_h$. The maximum achievable diversity order equals the rank of $R_h$, which is achieved by any encoder that achieves MADO with i.i.d. Rayleigh channels. If $R_h$ is full rank and MADO is achieved, then the coding advantage is different from the coding advantage in the i.i.d. case only by a constant $$\det^{\frac{1}{L+1}}(R_h)/\alpha_L.$$

Proof: Let $r_h:=\text{rank}(R_h)$ and the eigen-value decomposition of $R_h$ be $$R_h = [\, U_1 \;\; U_2\,]\begin{bmatrix} \Lambda_1 & 0 \\ 0 & \Lambda_2 \end{bmatrix}\begin{bmatrix} U_1^H \\ U_2^H \end{bmatrix}. \tag{12}$$

where $U_1$ is $(L+1)\times r_h$, $U_2$ is $(L+1)\times(L+1-r_h)$, $\Lambda_1$ is $r_h\times r_h$ full rank diagonal, and $\Lambda_2$ is an $(L+1-r_h)\times(L+1-r_h)$ all-zero matrix. Define $$\tilde{h}_1 := \Lambda_1^{-\frac{1}{2}} U_1^H h, \quad \tilde{h}_2 := U_2^H,$$

and $\tilde{h}:=[\tilde{h}_1^T \; \tilde{h}_2^T]^T$, where $$\Lambda_1^{-\frac{1}{2}}$$

is defined by $$\Lambda_1^{-\frac{1}{2}}\Lambda_1^{-\frac{1}{2}} = \Lambda_1^{-1}.$$

Since $h_2$ has an autocorrelation matrix $R_{\tilde{h}_2}=U_2^H R_h U_2=\Lambda_2$, all the entries of $\tilde{h}_2$ are zero almost surely. We can therefore write $$h = [\, U_1\Lambda_1^{\frac{1}{2}} \;\; U_2\,]\tilde{h} = U_1\Lambda_1^{\frac{1}{2}}\tilde{h}_1. \tag{13}$$

Since $$R_{\tilde{h}_1} = \Lambda_1^{-\frac{1}{2}} U_1^H R_h U_1 \Lambda_1^{-\frac{1}{2}} = I_{r_h}.$$

the entries of $\tilde{h}_1$, which are jointly Gaussian, are i.i.d.

Substituting (13) in (7), we obtain $$d^2(y, y') = h^H A_e h = \tilde{h}_1^H \Lambda_1^{\frac{1}{2}} U_1^H A_e U_1 \Lambda_1^{\frac{1}{2}} \tilde{h}_1 := \tilde{h}_1^H \tilde{A}_e \tilde{h}_1, \tag{14}$$

where $$\tilde{A}_e = \Lambda_1^{\frac{1}{2}} U_1^H A_e U_1 \Lambda_1^{\frac{1}{2}}$$

is an $r_h \times r_h$ matrix.

Following the same derivation as in (7)-(10), with $A_e$ replaced by $\tilde{A}_e$ and h replaced by $\tilde{h}_1$, we can obtain the diversity order and coding advantage for error event e as $$G_{d,e} = \text{rank}(\tilde{A}_e) := \tilde{r}_e \le r_h \text{ and } G_{c,e} = \left(\prod_{l=0}^{\tilde{r}_e-1} \tilde{\lambda}_{e,l}\right)^{1/\tilde{r}_e}, \tag{15}$$

where $\tilde{\lambda}_{e,l}$, $l=1, \ldots, r_h$, are the eigen-values of $\tilde{A}_e$.

Where $\Theta$ is designed such that MADO is achieved with i.i.d. channels, $A_e$ is full rank for any $e\in S_e$. Then $A_e$ is positive definite Hermitian symmetric, which means that there exists an $(L+1)\times(L+1)$ matrix $B_e$ such that $A_e=B_e^H B_e$. It follows that $$\tilde{A}_e = \Lambda_1^{\frac{1}{2}} U_1^H B_e^H B_e U_1 \Lambda_1^{\frac{1}{2}}$$

is the Gram matrix of $$B_e U_1 \Lambda_1^{\frac{1}{2}},$$

and thus $A_e$ has rank equal to $$\mathrm{rank}(B_e U_1 \Lambda_1^{\frac{1}{2}}) = \mathrm{rank}(U_1 \Lambda_1^{\frac{1}{2}}) = r_h,$$

the MADO for this correlated channel.

When the MADO $r_h$ is achieved, the coding advantage in (15) for e becomes $G_{c,e} = \det(\tilde{A}_e)^{1/r_h}$. If in addition, $R_h$ has full rank $r_h = L+1$, then $\det(\tilde{A}_e)^{1/r_h} = \det(A_e)^{1/(L+1)} \det(R_h)^{1/(L+1)}$, which means that in the full-rank correlated channel case, the full-diversity coding advantage is different from the coding advantage in the i.i.d. case only by a constant $\det(R_h)^{1/(L+1)}/\alpha_L$.

Theorem 5 asserts that the rank($R_h$) is the MADO for LE-OFDM systems as well as for coded OFDM systems that do not code or interleave across OFDM symbols. Also, MADO-achieving transmissions through i.i.d. channels can achieve the MADO for correlated channels as well.

Coding advantage $G_c$ is another parameter that needs to be optimized among the MADO-achieving encoders. Since for MADO-achieving encoders, coding advantage is given by $G_c = \min_{e \neq 0} G_{c,e} = \alpha_L \min_{e \neq 0} \det(A_e)$, we need to maximize the minimum determinant of $A_e$ over all possible error sequences e, among the MADO-achieving encoders.

The following theorem asserts that ZP-only transmission is one of the coding advantage maximizers.

Theorem 6 (ZP-only: maximum coding advantage): Suppose the entries of s(i) are drawn independently from a finite constellation $\mathcal{A}$ with minimum distance of $d_{min}(\mathcal{A})$. Then the maximum coding advantage of an LE-OFDM for i.i.d. Rayleigh fading channels under as1) is $G_{c,max} = \alpha_L d_{min}^2(\mathcal{A})$. The maximum coding advantage is achieved by ZP-only transmissions with any K.

In order to achieve high rate, we have adopted K=N−L and found two special classes of encoders that can achieve MADO in Theorem 4. The Vandermonde encoders are reminiscent of the parity check matrix of BCH codes, Reed-Solomon (RS) codes, and Goppa codes. It turns out that the MADO-achieving encoders and these codes are closely related.

Let us now take $\mathcal{S} = \mathbb{C}^{K \times 1}$. We call the codeword set $\mathcal{U}$ that is generated by $\Theta$ of size N×K Maximum Distance Separable (MDS) if $\delta_{min}(\mathcal{U}) = N-K+1$. The fact that N−K+1 is the maximum possible minimum Hamming distance of $\mathcal{U}$ is due to the Singleton bound. Although the Singleton bound was originally proposed and mostly known for Galois field codes, its proof can be easily generalized to real/complex field as well. In our case, it asserts that $\delta_{min} \leq N-K+1$ when $\mathcal{S} = \mathbb{C}^{K \times 1}$.

Notice that the assumption $\mathcal{S} = \mathbb{C}^{K \times T}$ is usually not true in practice, because the entries of s are usually chosen from a finite-alphabet set, e.g., QPSK or QAM. But such an assumption greatly simplifies the system design task: once we can guarantee $\delta_{min} = N-K+1$ for $\mathcal{S} = \mathbb{C}^{K \times 1}$, we can choose any constellation from other considerations without worrying about the diversity performance. However, for a finite constellation, i.e., when $\delta$ has finite cardinality, the result on $\delta_{min}$ can be improved. In fact, it can be shown that even with a square and unitary K×K matrix $\Theta$, it is possible to have $\delta_{min} = K$.

To satisfy the condition in Theorem 2 with the highest rate for a given N, we need K=N−L, and $\delta_{min} = L+1 = N-K+1$. In other words, to achieve constellation-irrespective full-diversity with highest rate, we need the code to be MDS. According to our Theorem 4, such MDS encoders always exist for any N and K<N.

In the GF, there also exist MDS codes. Examples of GF MDS codes include single-parity-check coding, repetition coding, generalized RS coding, extended RS coding, doubly extended RS coding, algebraic-geometry codes constructed using an elliptic curve.

When a GF MDS code exists, we may use it to replace our CF linear code, and achieve the same (maximum) diversity order at the same rate. But such GF codes do not always exist for a given field and N, K. For $F_2$, only trivial MDS codes exist. This means that it is impossible to construct, for example, binary (and thus simply decodeable) MDS codes that have $\delta_{min} \geq 2$, except for the repetition code. One other restriction of the GF MDS code is on the input and output alphabet. Although Reed-Solomon codes are the least restrictive among them in terms of the number of elements in the field, they are constrained on the code length and the alphabet size. Our linear encoders $\Theta$, on the other hand, operate over the complex field with no restriction on the input symbol alphabet or the coded symbol alphabet.

We obtain analogous results on our complex field MDS codes for achieving MADO to known results for GF MDS codes.

Theorem 7 (Dual MDS code): For an MDS code generated by $\Theta \in \mathbb{C}^{N \times K}$, the code generated by the matrix $\Theta_\perp$ is also MDS, where $\Theta_\perp$ is an N×(N−K) matrix such that $\Theta_\perp^T \Theta = 0$.

A generator $\Theta$ for an MDS code is called systematic if it is in the form $[I_K, P]^T$ where P is a K×(N−K) matrix.

Theorem 8 (Systematic MDS code): A code generated by $[I, P]^T$ is MDS if and only if every square submatrix of P is nonsingular.

To construct systematic MDS codes using Theorem 8, the following two results can be useful:

i) Every square submatrix of a Vandermonde matrix with real, positive entries is nonsingular.

ii) A K×(N−K) matrix P is called a Cauchy matrix if its (i, j)th element $[P]_{ij} = 1/(x_i + y_j)$ for some elements $x_1, x_2, \ldots, x_K$, $y_1, y_2, \ldots, y_{N-K}$, such that the $x_i$'s are distinct, the $y_j$'s are distinct, and $x_i + y_j \neq 0$ for all i, j. Any square submatrix of a Cauchy matrix is nonsingular.

Next, we discuss decoding options for our CF code. For this purpose, we restrict our attention to the case that $\mathcal{S}$ is a finite set, e.g., a finite constellation carved from (possibly sealed and shifted) $Z^K$. This includes BPSK, QPSK, and QAM as special cases. Since the task of the receiver involves both channel equalization and decoding of the CF linear code, we will consider the combined task jointly and will use the words decoding, detection, and equalization interchangeably.

Maximum Likelihood Detection

To achieve MADO, LE-OFDM requires ML decoding. For the input output relationship in (2) and under the AWGN assumption, the minimum-distance detection rule becomes ML and can be formulated as follows:

$$\hat{s} = \arg\min_{s \in \mathcal{S}} \|x - D_H \Theta s\|. \quad (16)$$

ML decoding of LE transmissions belongs to a general class of lattice decoding problems, as the matrix product $D_H\Theta$ in (2) gives rise to a discrete subgroup (lattice) of the $C^N$ space under the vector addition operation. In its most general form, finding the optimum estimate in (16) requires searching over $|\mathcal{S}|$ vectors. For large block sizes and/or large constellations, it is practically impossible to perform exhaustive search since the complexity depends exponentially on the number of symbols in the block.

Figure 5:
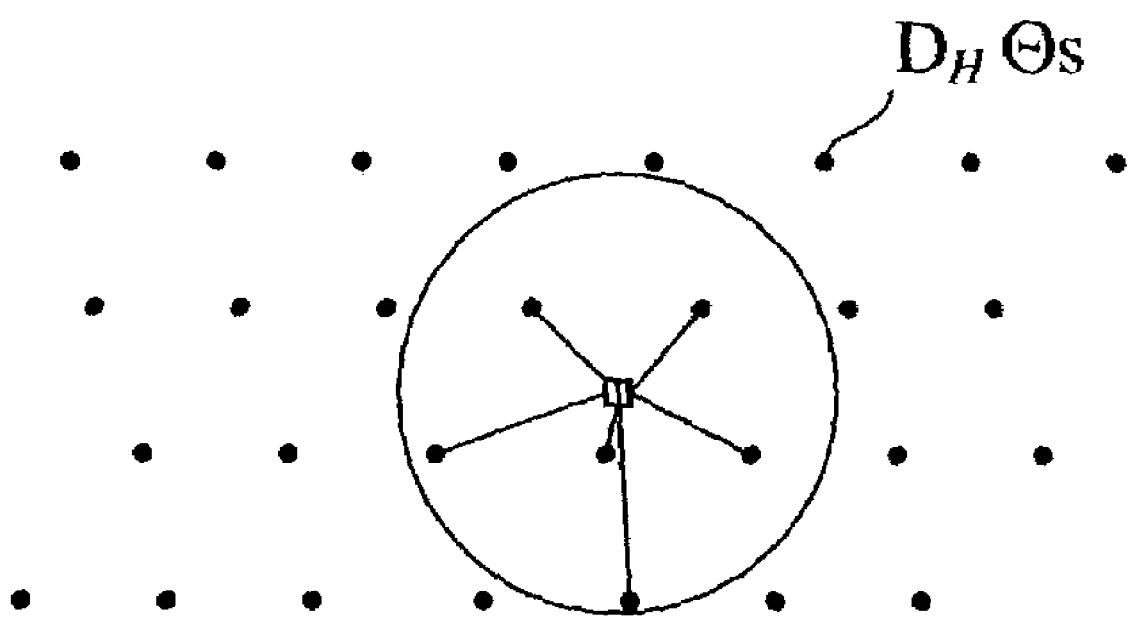
FIG. 5 illustrates sphere decoding applied in one embodiment of the receiver of FIG. 1.

A relatively less complex ML search is possible with the sphere decoding (SD) algorithm (c.f., FIG. 5), which only searches coded vectors that are within a sphere centered at the received symbol x (c.f., (2)). Denote the QR decomposition of $D_H\Theta$ as $D_H\Theta=QR$, where Q has size N×K and satisfies $Q^H Q=I_{K\times K}$, and R is an upper triangular K×K matrix. The problem in (16) then converts to the following equivalent problem $$\hat{s} = \arg\min_{s \in \mathcal{S}} \|Q^H x - Rs\|, \quad (17)$$

SD starts its search by looking only at vectors s such that $$\|Q^H x - Rs\| < C, \quad (18)$$

where C is the search radius, a decoding parameter. Since R is upper triangular, in order to satisfy the inequality in (18), the last entry of s must satisfy $|[R]_{K,K}[s]_K| < C$, which reduces the search space if C is small. For one possible value of the last entry, possible candidates of the last-but-one entry are found and one candidate is taken. The process continues until a vector of $s_0$ is found that satisfies (18). Then the search radius C is set equal to $\|Q^H x - Rs_0\|$ and a new search round is started. If no other vector is found inside the radius, then $s_0$ is the ML solution. Otherwise, if $s_1$ is found inside the sphere, the search radius is again reduced to $\|Q^H x - Rs_1\|$, and so on. If no $s_0$ is ever found inside the initial sphere of radius C, then C is too small. In this case, either a decoding failure is declared or C is increased.

The complexity of the SD is polynomial in K, which is better than exponential but still too high for practical purposes. Indeed, it is not suitable for codes of block size greater than, say, 16. When the block size is small, the sphere decoder can be considered as an option to achieve the ML performance at manageable complexity.

In the special case of ZP-only transmissions, the received vector is given by $\tilde{x}=Hs+\tilde{n}$. Thanks to the zero-padding, the full convolution of the transmitted block s with the FIR channel is preserved and the channel is represented as the banded Toeplitz matrix H. In such a case, Viterbi decoding can be used at a complexity of $\mathcal{O}(Q^L)$ per symbol, where Q is the constellation size of the symbols in s.

Low-Complexity Linear Detection

Zero-forcing (ZF) and MMSE detectors (equalizers) offer low-complexity alternatives. The ZF and MMSE equalizers based on the input-output relationship (2) can be written as:

$$G^{zf}=(D_H\Theta)^\dagger \text{ and } G^{mmse}=R_s\Theta^H D_H^H(\sigma_n^2 I_N + D_H\Theta R_s\Theta^H D_H^H)^{-1},$$

respectively, where $(\cdot)^\dagger$ denotes pseudo-inverse, $\sigma_n^2$ is the variance of entries of noise $\eta$, and $R_s$ is the autocorrelation matrix of s. Given the ZF and MMSE equalizers, they each require $\mathcal{O}(N\times K)$ operations per K symbols. So per symbol, they require only $\mathcal{O}(N)$ operations. To obtain the ZF or MMSE equalizers, inversion of a N×N matrix is involved, which has complexity $\mathcal{O}(N^3)$. However, the equalizers only needs to be recomputed when the channel changes.

Decision-Directed Detection

The ML detection schemes in general have high complexity, while the linear detectors may have decreased performance. The class of decision-directed detectors lies between these categories, both in terms of complexity and in terms of performance.

Figure 6:
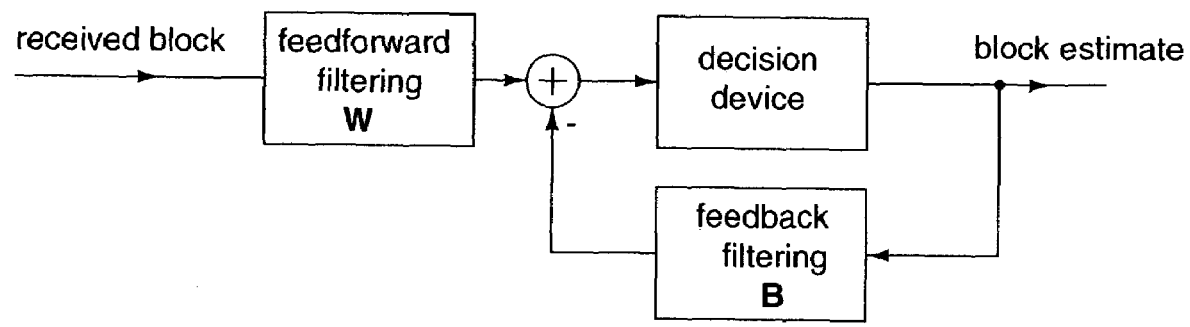
FIG. 6 illustrates an example portion of the receiver of FIG. 1.

Decision-directed detectors capitalize on the finite alphabet property that is almost always available in practice. In the equalization scenario, they are more commonly known as Decision Feedback Equalizers (DFE). In a single-user block formulation, the DFE has a structure as shown in FIG. 6, where the feed-forward filter is represented as a matrix W and the feedback filter is presented as B. Since we can only feed back decisions in a casual fashion, B is usually chosen to be a strictly upper or lower triangular matrix with zero diagonal entries. Although the feedback loop is represented as a matrix, the operations happen in a serial fashion: the estimated symbols are fed back serially as their decisions are formed one by one. The matrices W and B can be designed according to ZF or MMSE criteria. When B is chonse to be triangular and the MSE between the block estimate before the decision device is minimized, the feed-forward and feedback filtering matrices can be found from the following equations:

$$R_s^{-1}+\Theta^H D_H^H R_\eta^{-1} D_H \Theta = U^H \Lambda U, \quad (19)$$

$$W=UR_s\Theta^H D_H^H (R_\eta+D_H\Theta R_s\Theta^H D_H^H)^{-1}, \; B=U-I, \quad (20)$$

where the R's denote autocorrelation matrices, (19) was obtained using Cholesky decomposition, and U is an upper triangular matrix with unit diagonal entries. Since the feed-forward and feedback filtering entails only matrix-vector multiplications, the complexity of such decision directed schemes is comparable to that of linear detectors. Because decision directed schemes capitalize on the finite-alphabet property of the information symbols, the performance is usually (much) better than linear detectors.

As an example, we list in the following table the approximate number of flops needed for different decoding schemes when K=14, L=2, N=16, and BPSK modulation is deployed; i.e., $\mathcal{S}=\{\pm 1\}^K$.

TABLE 1

| Decoding Scheme | order of Flops/symbol |
| --- | --- |
| Exhaustive ML | $>2^K = 2^{14} = 16.384$ |
| Sphere Decoding | $\approx 800$ (empirical) |
| ZF/MMSE | $\approx N = 16$ |
| Decision-Directed | $\approx N = 16$ |
| Viterbi for ZP-only | $2^L = 2^2 = 4$ |

Iterative Detectors

Other possible decoding methods include iterative detectors, such as successive interference cancellation with iterative least squares (SIC-ILS), and multistage cancellations. These methods are similar to the illustrated DFE in the interference from symbols that are decided in a block is canceled before a decision on the current symbol is made. In SIC-ILS, least squares is used as the optimization criterion and at each step or iteration, the cost function (least-squares) will decrease or remain the same. In multistage cancellation, the MMSE criterion is often used such that MF is optimum after the interference is removed (supposing that the noise is white). The difference between a multistage cancellation scheme and the block DFE is that the DFE symbol decisions are made serially; and for each undecided symbol, only interference from symbols that have been decided is cancelled; while in multistage cancellation, all symbols are decided simultaneously and then their mutual interferences are removed in a parallel fashion.

Figure 7:
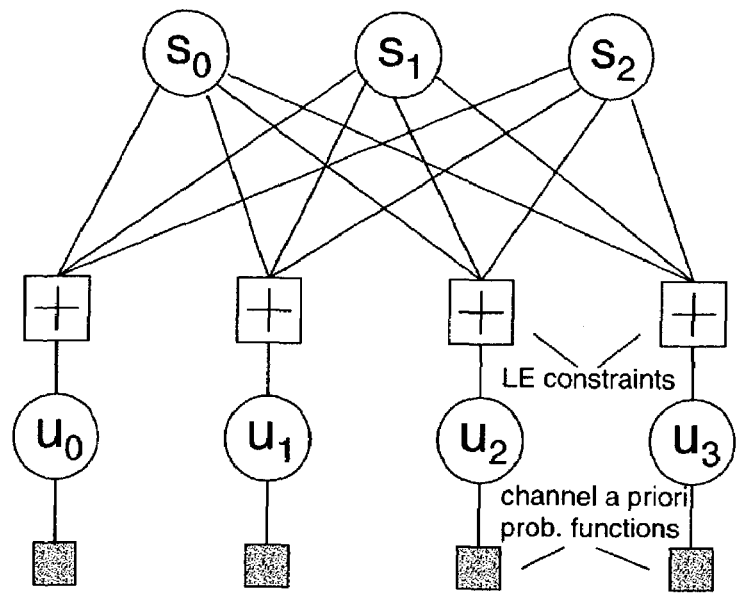
FIG. 7 is factor graph representing an example linear encoding process.

As illustrated in FIG. 7, another embodiment may utilize for LEOFDM equalization an iterative "sum-product" decoding algorithm, which is also used in Turbo decoding. In particular, the coded system is represented using a factor graph, which describes the interdependence of the encoder input, the encode output, and the noise-corrupted coded symbols.

As a simple example, suppose the encoder takes a block of 3 symbols s:=$[s_0, s_1, s_2]^T$ as input and linearly encodes them by a 4×3 matrix Θ to produce the coded symbols u:=$[u_0, u_1, u_2, u_3]$. After passing through the channel (OFDM modulation/demodulation), we obtain the channel output $x_i$=H($e^{j2\pi i/4}$)$u_i$, i=0, 1, 2, 3. The factor graph for such a coded system is shown in FIG. 7, where the LE is represented by linear constraints between the LE input symbols s and the LE output symbols u.

Parallel Encoding for Low Complexity Decoding

When the number of carriers N is very large (e.g., 1,024), it is desirable to keep the decoding complexity manageable. To achieve this we can split the encoder into several smaller encoders. Specifically, we can choose Θ=PΘ', where P is a permutation matrix that interleaves the subcarriers, and Θ' is a block diagonal matrix: Θ'=diag($Θ_0, Θ_1, \ldots, Θ_{M-1}$). This is a essentially a form of coding for interleaved OFDM, except that the coding is done in complex domain here. The matrices $Θ_m$, m=0, . . . , M−1 are of smaller size than Θ and all of them can even be chosen to be identical. With such designed Θ, decoding s from the noisy $D_H$Θs is equivalent to decoding M coded sub-vectors of smaller sizes and therefore the overall decoding complexity can be reduced considerably. Such a decomposition is particularly important when a high complexity decoder such as the sphere decoder is to be deployed.

The price paid for low decoding complexity is a decrease in transmission rate. When such parallel encoding is used, we should make sure that each of the $Θ_m$ matrices can guarantee full diversity, which requires $Θ_m$ to have L redundant rows. The overall Θ will then have ML redundant rows, which corresponds to an M-fold increase of the redundancy of a full single encoder of size N×K. If a fixed constellation is used for entries in s, then square $Θ_m$'s can be used, which does not lead to loss of efficiency.

Figure 8:
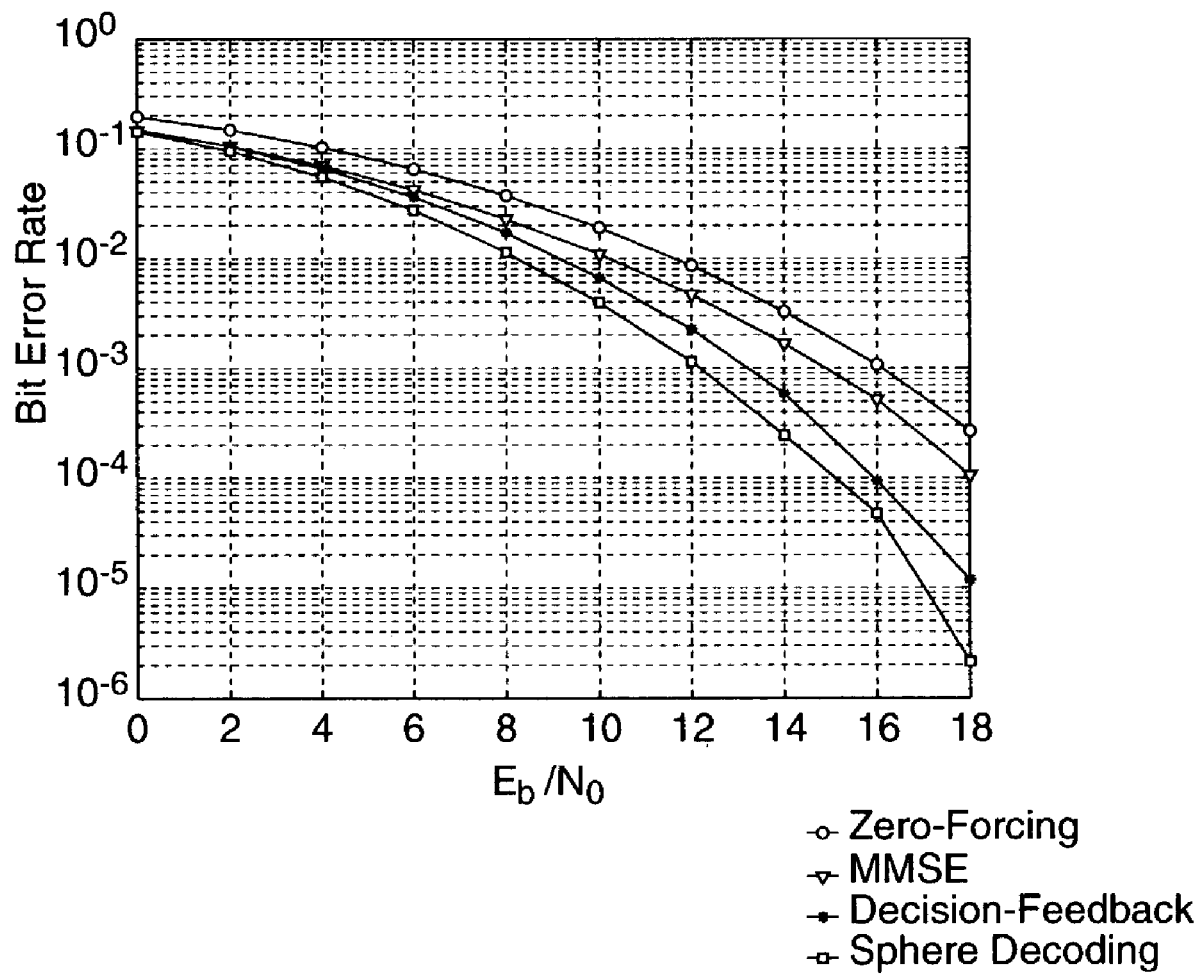
FIGS. 8-10 are graphs that illustrate exemplary results of simulations of the described techniques.
Figure 9:
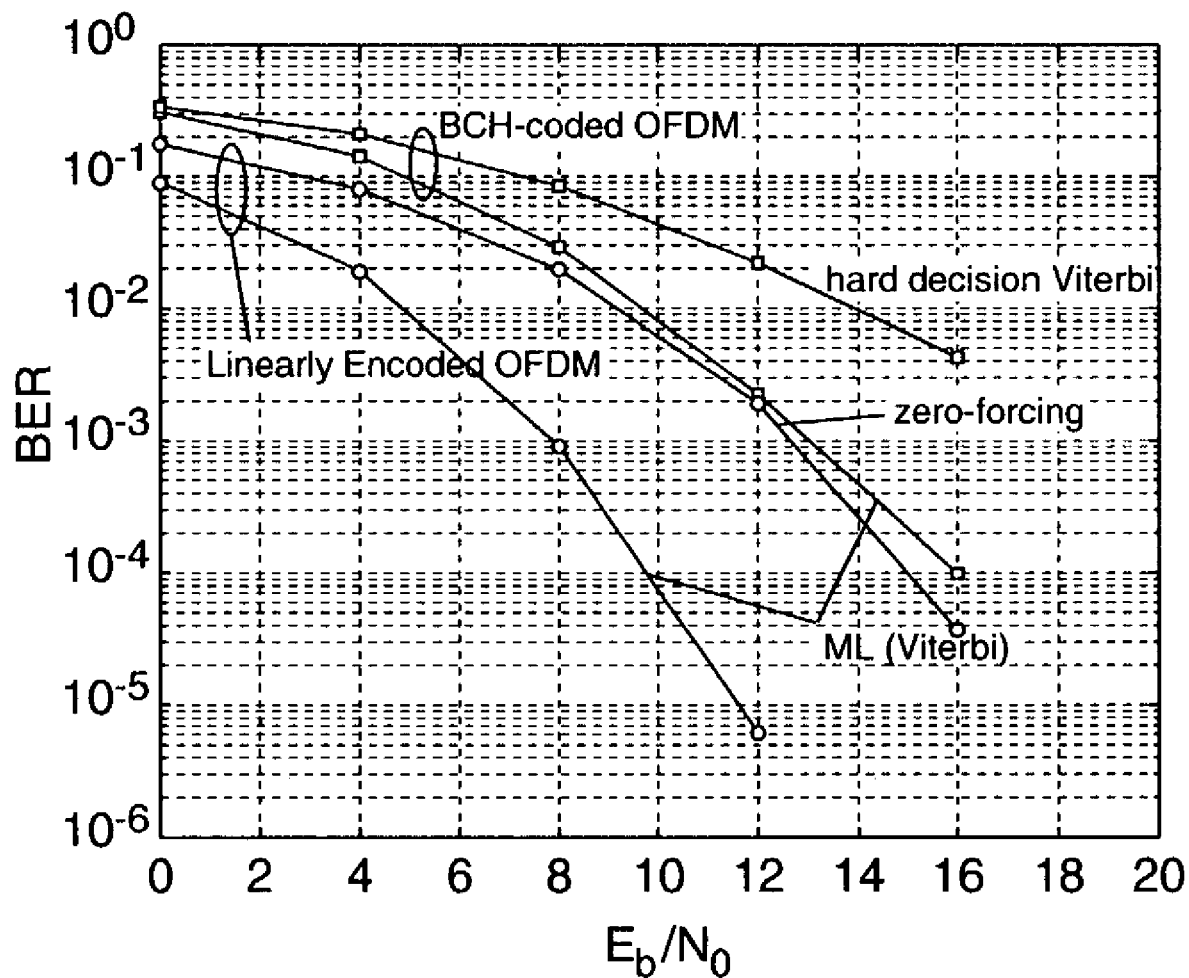
Figure 10:
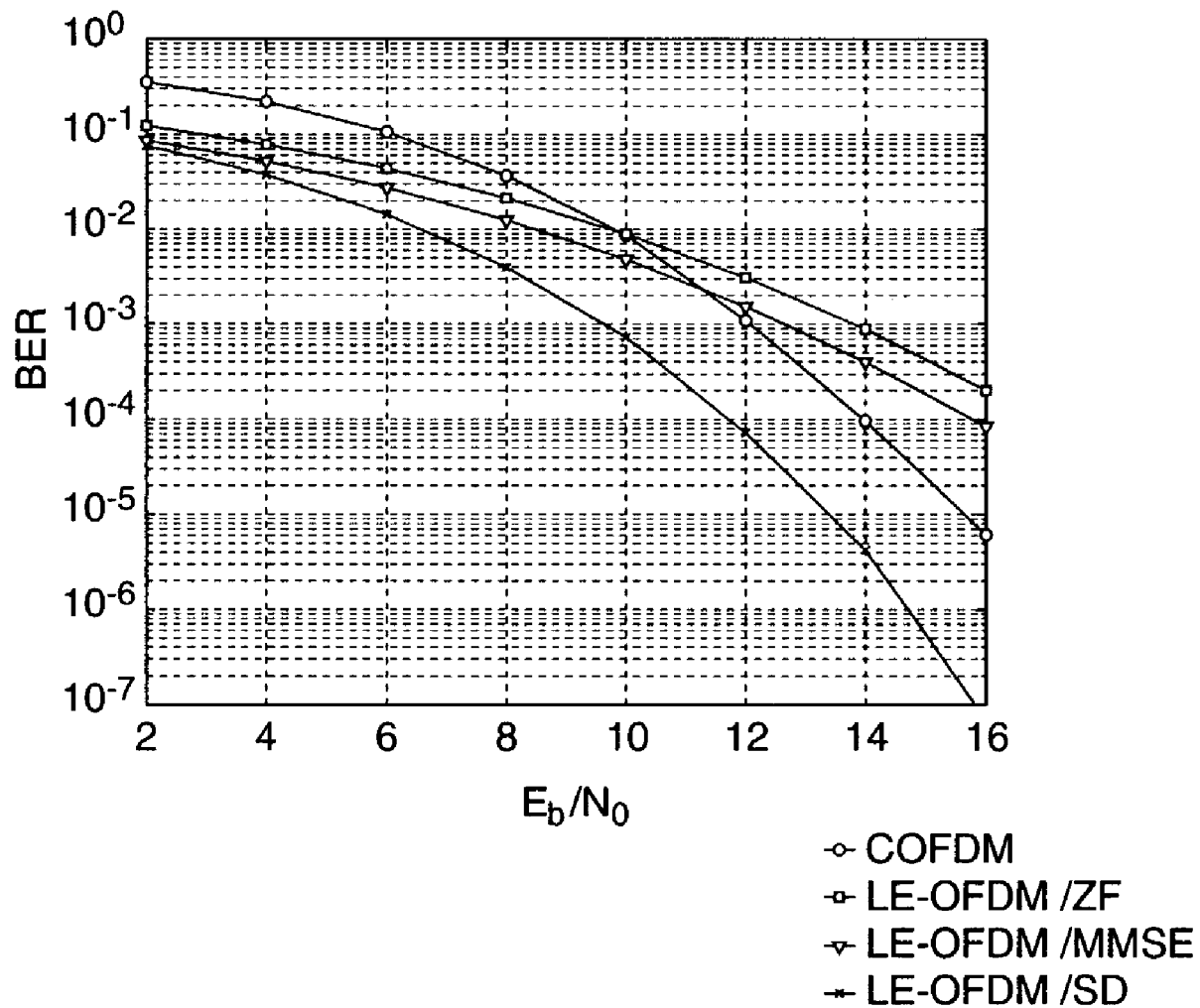

FIGS. 8-10 are graphs that illustrate exemplary results of simulations of the described techniques. In the illustrated results, we compare the proposed wireless communication techniques with existing coded OFDM systems that deploy existing GF block codes and convolutional codes. In all cases, BPSK constellation is used, and in Test Case 2 and 3, the binary encoded symbols are mapped to ±1's before OFDM modulation.

Test case 1 (Decoding of LE-OFDM): We first test the performance of different decoding algorithms. The LE-OFDM system has parameters K=14, N=16, L=2. The channel is i.i.d. Rayleigh and BER's for 200 random channel realizations according to As1) are averaged. FIG. 8 shows the performance of ZF, MMSE, DFE, and sphere decoding (ML) for LE-OFDM. We notice that at BER of $10^{-4}$ DFE performs about 2 dB better than the MMSE detectors, while at the same time it is only less than 1 dB inferior to the sphere decoder, which virtually achieves the ML decoding performance. The complexity of ZF, MMSE, DFE is all about N=16 flops per symbol, which is much less than the sphere decoding algorithm, which empirically needs about 800 flops per symbol in this case.

Test case 2 (Comparing LE-OFDM with BCH-coded OFDM): For demonstration and verification purposes, we first compare LE-OFDM with coded OFDM that relies on GF block coding. The channel is modeled as FIR with 5 i.i.d. Rayleigh distributed taps. In FIG. 9, we illustrate Bit Error Rate (BER) performance of CF coded OFDM with Vandermonde code of Theorem 4, and that of binary BCH-coded OFDM. The system parameters are K=26, N=31. The generating polynomial of the BCH code is g(D)=1+$D^2$+$D^5$. Since we can view this BCH as a rate 1 convolutional code with the same generator and with termination after 26 information symbols (i.e., the code ends at the all-zero state), we can use the Viterbi algorithm for soft-decision ML BCH decoding. For LE-OFDM, since the transmission is essentially a ZP-only single-carrier scheme, the Viterbi algorithm is also applicable for ML decoding.

Since the binary (26, 31) BCH code has minimum Hamming distance 3, it possesses a diversity order of 3, which is only half of the maximum possible (L+1=6) that LE-OFDM achieves with the same spectral efficiency. This explains the difference in their performance. We can see that when the optimum ML decoder is adopted by both receivers. LE-OFDM outperforms coded OFDM with BCH coding considerably. The slopes of the corresponding BER curves also confirm our theoretical results.

Test case 3 (Comparing LE-OFDM with convolutionally coded OFDM): In this test, we compare (see FIG. 10) our LE-OFDM system with convolutionally coded OFDM (with a rate ½ code punctured to rate ¾ followed by interleaving) that is deployed by the HiperLAN2 standard over the channels used in Test Case 2. The rate ½ mother code has its generator in octal form as (133, 171) and there are 64 states in its trellis. Every 3rd bit from the first branch and every second bit from the second branch of the mother code are punctured to obtain the rate ¾ code, which results in a code whose weight enumerating function is $8W^5$+$31W^6$+$160W^7$+ . . . . So the free distance is 5, which means that the achieved diversity is 5, less than the diversity order 6 achieved by LE-OFDM.

The parameters are K=36, N=48. We use two parallel truncated DCT encoders; that is, Θ=$I_{2\times 2}$⊗$Θ_0$, where ⊗ denotes Kronecker product, and $Θ_0$ is a 24×18 encoder obtained by taking the first 18 columns of a 24×24 DCT matrix. With ML decoding, LE-OFDM performs about 2 dB better than convolutionally coded OFDM. From the ML performance curves in FIG. 10, LE-OFDM seems to achieve a larger coding advantage than the punctured convolutional code we used.

Surprisingly, even with linear MMSE equalization, the performance of LE-OFDM is better than coded OFDM for SNR values less than 12 dB. The complexity of ML decoding for LE-OFDM is quite high in the order of 1,000 flops per symbol. But the ZF and MMSE decoders have comparable or even lower complexity than the Viterbi decoder for the convolutional code.

The complexity of LE-OFDM can be dramatically reduced using the parallel encoding method with square encoders. It is also possible to combine CF coding with conventional GF coding, in which case only small square encoders of size 2×2 or 4×4 are necessary to achieve near optimum performance.

Various embodiments of the invention have been described. The described techniques can be embodied in a variety of receivers and transmitters including base stations, cell phones, laptop computers, handheld computing devices, personal digital assistants (PDA's), and the like. The devices may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer readable instructions that when executed in a wireless communication device, cause the wireless communication device to carry out one or more of the techniques described herein. These and other embodiments are within the scope of the following claims.

The invention claimed is:

1. A wireless communication device comprising:
   an encoder that applies a linear transformation to a stream of information bearing symbols selected from a constellation having a finite alphabet to produce a stream of precoded symbols that are complex numbers and are not restricted by the constellation of the information bearing symbols; and
   a modulator to produce an output waveform in accordance with the stream of precoded symbols for transmission through a wireless channel.

2. The wireless communication device of claim 1, wherein the modulator generates the output waveform as a multicarrier waveform having a set of subcarriers, and the encoder encodes the stream of information bearing symbols so that the subcarriers carry different linear combinations of the information symbols.

3. The wireless communication device of claim 1, wherein the encoder applies the linear transformation by applying a unitary matrix to the information bearing symbols.

4. A wireless communication device comprising:
   an encoder that applies a matrix to linearly transform blocks of K information bearing symbols selected from a constellation having a finite alphabet to produce blocks of N precoded symbols that are complex numbers and are not restricted to the constellation of the information bearing symbols; and
   a modulator that generates a multicarrier waveform having a set of subcarriers, where N is the number of subcarriers of the multi-carrier waveform and K is less than or equal to N.

5. The wireless communication device of claim 4, wherein the linear encoder has a code rate r=K/N.

6. The wireless communication device of claim 4, wherein the linear encoder applies a matrix of size N×K to blocks of K information bearing symbols to produce blocks of N precoded symbols.

7. A wireless communication device, comprising:
   an encoder that applies a matrix to linearly transform blocks of K information bearing symbols selected from a constellation having a finite alphabet to produce blocks of N precoded symbols that are complex numbers and are not restricted by the constellation of the information bearing symbols; and
   a modulator that generates a multicarrier waveform having a set of subcarriers for transmission over a wireless channel,
   wherein N is the number of subcarriers and K is less than or equal to N, and
   wherein the size of the matrix is selected as a function of an order L of the wireless channel, and the number K of symbols per block is selected as a function of the channel order L.

8. The wireless communication device of claim 7, wherein K is selected so that $K \leq N-L$.

9. The wireless communication device of claim 7, wherein K is selected so that $K=N-L$.

10. The wireless communication device of claim 6, wherein the linear encoder applies the matrix to perform a vector multiplication on the blocks of K information bearing symbols to produce blocks of N precoded symbols, and applies each block of N precoded symbols across the N subcarriers.

11. The wireless communication device of claim 1, wherein the wireless communication device comprises one of a base station and a mobile device.

12. A wireless communication device comprising:
   an encoder that applies a plurality of M matrices to linearly transform a stream of information bearing symbols selected from a constellation having a finite alphabet to produce a stream of precoded symbols that are complex numbers and are not restricted by the constellation of the information bearing symbols; and
   a modulator to produce an output waveform in accordance with the stream of precoded symbols for transmission through a wireless channel,
   where the matrices are identical and collectively have M*L redundant rows, where L represents an order of the channel.

13. A wireless communication device comprising:
   a demodulator that receives a waveform carrying a encoded transmission and produces a demodulated data stream, wherein the encoded data stream was produced by applying a linear transformation to a stream of information bearing symbols selected from a constellation having a finite alphabet to produce a stream of precoded symbols that are complex numbers and are not restricted by the constellation of the information bearing symbols; and
   a decoder that decodes the demodulated data to produce estimated data.

14. The wireless communication device of claim 13, wherein the decoder applies one of maximum-likelihood detection, zero-force (ZF) detection, minimum mean squared error (MMSE) detection, decision-directed detection, iterative detection, to decode the demodulated data.

15. The wireless communication device of claim 13, wherein the wireless communication device comprises one of a base station and a mobile device.

16. A method comprising:
applying a linear transformation to a stream of information bearing symbols selected from a constellation having a finite alphabet to produce a stream of precoded symbols that are complex numbers and are not restricted by the constellation of the information bearing symbols; and
outputting a waveform in accordance with the stream of precoded symbols for transmission through a wireless channel.

17. The method of claim 16, wherein outputting the waveform comprises:
outputting the output waveform as a multicarrier waveform having a set of subcarriers; and
encoding the stream of information bearing symbols so that the subcarriers carry different linear combinations of information symbols.

18. The method of claim 16, wherein applying the linear transformation to the stream of information bearing symbols comprises applying a unitary matrix to the stream of information bearing symbols.

19. A method comprising:
applying a matrix to linearly transform blocks of K information bearing symbols that are selected from a constellation having a finite alphabet to produce blocks of N precoded symbols that are complex numbers and are not restricted by the constellation of the information bearing symbols, and
outputting a multicarrier waveform having a set of subcarriers in accordance with the stream of precoded symbols for transmission through a wireless channel,
where N is the number of subcarriers, and K is less than or equal to N.

20. The method of claim 19, wherein applying the linear transformation comprises applying the linear transformation to blocks of K information bearing symbols to produce blocks of N precoded symbols at a code rate r=K/N.

21. The method of claim 19, wherein applying the linear transformation comprises applying a matrix of size N×K to the blocks of information bearing symbols.

22. The method of claim 19, further comprising selecting the number of symbols per block K as a function of an order of the channel.

23. The method of claim 19, further comprising selecting the number of symbols per block so that K≦N−L, wherein L represents an order of the channel.

24. The method of claim 19, further comprising selecting the number of symbols per block so that K=N−L, where L represents an order of the channel.

25. The method of claim 19, wherein applying the linear transformation comprises applying a matrix to perform a vector multiplication on the blocks of K information bearing symbols to produce blocks of N precoded symbols.

26. A method comprising:
applying a plurality of M matrices to linearly transform a stream of information bearing symbols selected from a constellation having a finite alphabet, wherein the M matrices linearly transform the stream of information bearing symbols to produce a stream of precoded symbols that are complex numbers and are not restricted by the constellation of the information bearing symbols; and
outputting a waveform in accordance with the stream of precoded symbols for transmission through a wireless channel,
where the matrices are identical and have M*L redundant rows and, where L represents an order of the channel.

27. A computer-readable medium comprising instructions to cause a programmable processor to:
apply a linear transformation to a stream of information bearing symbols selected from a constellation having a finite alphabet to produce a stream of precoded symbols that are complex numbers and are not restricted by the constellation of the information bearing symbols; and
output waveform in accordance with the stream of precoded symbols for transmission through a wireless channel.

28. The computer-readable medium of claim 27, further comprising instructions to cause the programmable processor to:
output the output waveform as a multicarrier waveform having a set of subcarriers; and
encode the stream of information bearing symbols so that the subcarriers carry different linear combinations of information symbols.

* * * * *